US011481099B2

(12) United States Patent
Gumapac et al.

(10) Patent No.: US 11,481,099 B2
(45) Date of Patent: Oct. 25, 2022

(54) DISPLAY APPARATUS THAT SWITCHES DISPLAY FROM FIRST SCREEN TO SECOND SCREEN, AND IMAGE FORMING APPARATUS

(71) Applicant: KYOCERA Document Solutions Inc., Osaka (JP)

(72) Inventors: Rinel Gumapac, Osaka (JP); Carlo Nino Bitoon, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/510,158

(22) Filed: Oct. 25, 2021

(65) Prior Publication Data

US 2022/0137798 A1    May 5, 2022

(30) Foreign Application Priority Data

Nov. 2, 2020 (JP) .............................. JP2020-183648

(51) Int. Cl.
*G06F 3/048* (2013.01)
*G06F 3/04845* (2022.01)
*H04N 1/00* (2006.01)
*G06F 3/04886* (2022.01)
*G06F 3/04817* (2022.01)

(52) U.S. Cl.
CPC ...... *G06F 3/04845* (2013.01); *G06F 3/04817* (2013.01); *G06F 3/04886* (2013.01); *H04N 1/00411* (2013.01); *H04N 1/00424* (2013.01); *H04N 1/00517* (2013.01)

(58) Field of Classification Search
CPC ............. H04N 1/00411; H04N 1/0424; H04N 1/00417; G06F 3/04845; G06F 3/04817; G06F 3/04886
See application file for complete search history.

(56) References Cited

U.S. PATENT DOCUMENTS

| | | | |
|---|---|---|---|
| 8,769,431 B1* | 7/2014 | Prasad | G06F 3/0488 715/764 |
| 10,048,845 B2* | 8/2018 | Yamada | G06F 3/041 |
| 2008/0120572 A1* | 5/2008 | Bahn | G06F 3/0482 715/810 |
| 2015/0149941 A1* | 5/2015 | Itagaki | G06F 3/04817 715/765 |
| 2017/0235706 A1* | 8/2017 | Esterly | G06F 3/048 715/243 |
| 2019/0245989 A1* | 8/2019 | Yoshida | H04N 1/00517 |

FOREIGN PATENT DOCUMENTS

JP    2019-106007 A    6/2019

* cited by examiner

*Primary Examiner* — Mahelet Shiberou
(74) *Attorney, Agent, or Firm* — IP Business Solutions, LLC

(57) ABSTRACT

A display apparatus includes a display device, a touch panel, and a control device. The display device displays a screen in a display region. The touch panel is overlaid on the display device. The control device includes a processor, and acts, when the processor executes a control program, as a controller that causes the display device to display a first screen of a size that covers an entirety of the display region, with a predetermined first icon added to the first screen, and to display, instead of the first screen, a second screen smaller in size than the first screen in a predetermined region, when the touch panel detects a predetermined operation performed on the first icon.

6 Claims, 25 Drawing Sheets

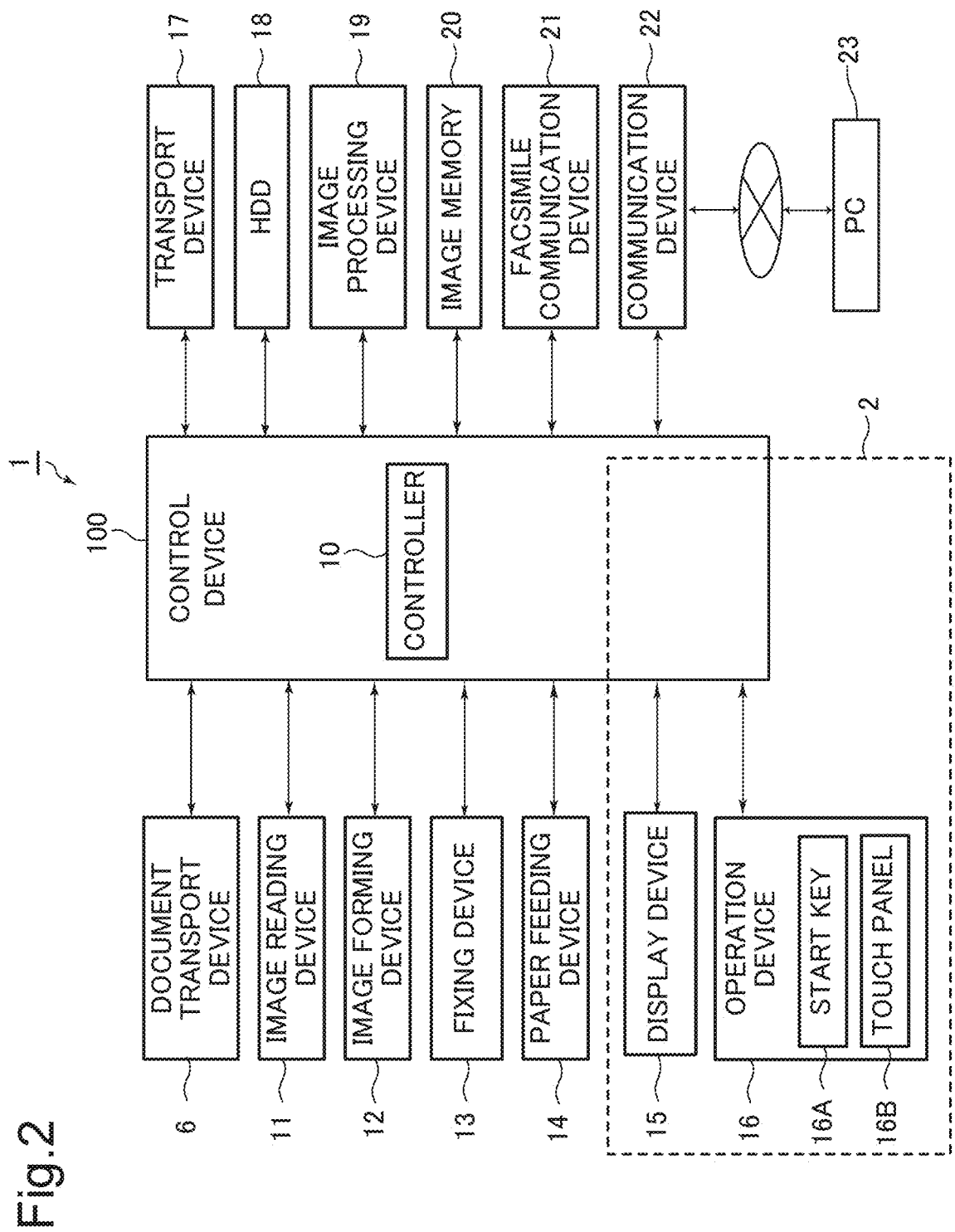

DISPLAY APPARATUS THAT SWITCHES DISPLAY FROM FIRST SCREEN TO SECOND SCREEN, AND IMAGE FORMING APPARATUS

INCORPORATION BY REFERENCE

This application claims priority to Japanese Patent Application No. 2020-183648 filed on Nov. 2, 2020, the entire contents of which are incorporated by reference herein.

BACKGROUND

The present disclosure relates to a display apparatus and an image forming apparatus, and in particular to a technique to switch screens to be displayed.

A technique is known to switch display between a first screen of a size that occupies the entire display region of a display device, and a second screen smaller in size than the first screen. One of such known techniques includes rotating a base screen displayed over the entirety of the display region of a touch panel display, and displaying the base screen in a size reduced by a predetermined magnification, when an operation panel is rotated from a horizontally long state to a vertically long state.

SUMMARY

The disclosure proposes further improvement of the foregoing technique.

In an aspect, the disclosure provides a display apparatus including a display device, a touch panel, and a control device. The display device displays a screen in a display region. The touch panel is overlaid on the display device. The control device includes a processor, and acts, when the processor executes a control program, as a controller that causes the display device to display a first screen of a size that covers an entirety of the display region, with a predetermined first icon added to the first screen, and to display, instead of the first screen, a second screen smaller in size than the first screen in a predetermined region, when the touch panel detects a predetermined operation performed on the first icon.

In another aspect, the disclosure provides an image forming apparatus including the foregoing display apparatus, an image forming device, and a storage device. The image forming device forms an image on a recording medium. The storage device is for storing a use history of each of a plurality of items for executing an image forming operation. When the user history indicates an unused item, the controller causes the display device to display information about an item other than the unused item, on the second screen.

BRIEF DESCRIPTION OF THE DRAWINGS

FIG. 2 is a block diagram showing an internal configuration of the image forming apparatus;

DETAILED DESCRIPTION

Figure 1:
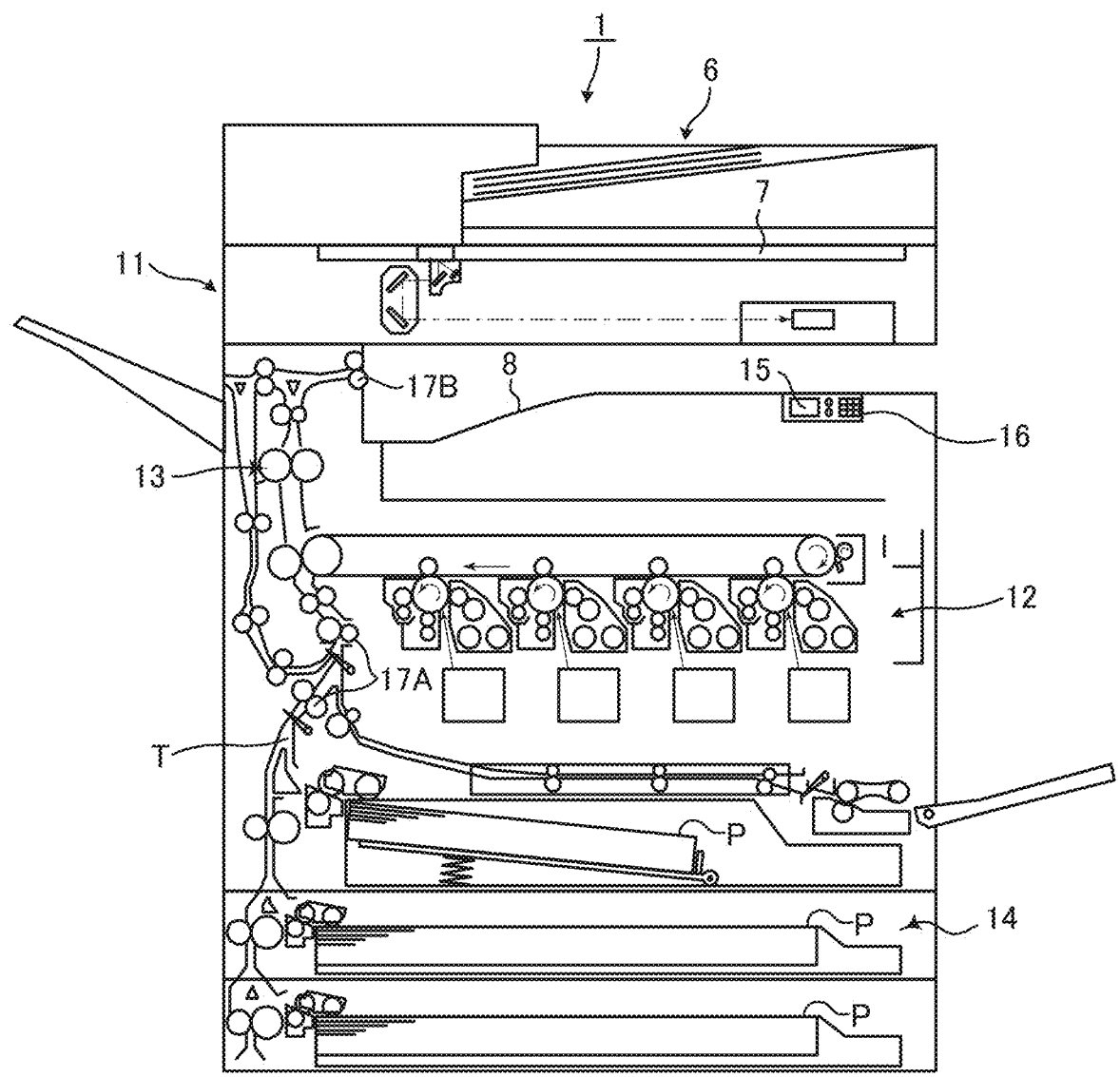
FIG. 1 is a front cross-sectional view showing a structure of an image forming apparatus according to an embodiment of the disclosure.

Hereafter, an image forming apparatus, including a display apparatus according to an embodiment of the disclosure, will be described with reference to the drawings. FIG. 1 is a front cross-sectional view showing a structure of an image forming apparatus according to an embodiment of the disclosure. FIG. 2 is a block diagram showing an internal configuration of the image forming apparatus.

Referring to FIG. 1 and FIG. 2, the image forming apparatus 1 is a multifunction peripheral having a plurality of functions such as copying, transmission, printing, and facsimile communication. Inside the casing of the image forming apparatus 1, a plurality of components for realizing the functions of the image forming apparatus 1 are accommodated. Specifically, for example, an image reading device 11, an image forming device 12, a fixing device 13, and a paper feeding device 14 are provided in the casing.

The image forming apparatus 1 includes a control device 100. The control device 100 includes a processor, a random-access memory (RAM), and a read-only memory (ROM). The processor is, for example, a central processing device (CPU), a micro processing device (MPU), or an application specific integrated circuit (ASIC).

The control device 100 acts as a controller 10, when the processor executes a control program stored in the ROM or a hard disk drive (HDD) 18. Here, the controller 10 may be constituted in the form of a logic circuit, instead of being realized by the operation according to the control program.

The controller 10 controls the overall operation of the image forming apparatus 1. To be more detailed, the controller 10 controls the operation of each of the components of the image forming apparatus 1, and also the communication with, for example, a personal computer (PC) 23 connected via a network. The controller 10 also executes, by operating according to a display program to be subsequently described, a mobile screen display operation including causing a display device 15 to display a basic screen with a first icon displayed thereon, and to display a mobile screen in place of the basic screen, according to an operation of the user performed on the first icon.

Here, the basic screen refers to a screen of a size that occupies the entirety of the display region of the display device 15. The mobile screen refers to a screen smaller in size than the basic screen. The size of the basic screen is not specifically limited but may be, for example, 10.1 inches. The size of the mobile screen is not specifically limited either, but it is preferable that the mobile screen has a predetermined size that fits the size of the user's hand, to facilitate the user to handle the device by one hand. In particular, it is preferable that the screen size is between 5.5 inches and 6.5 inches, both ends inclusive. In addition, it is preferable that the shape of the mobile screen is vertically long.

The control device 100 is electrically connected to a document transport device 6, the image reading device 11, the image forming device 12, the fixing device 13, the paper feeding device 14, the display device 15, an operation device 16 including a touch panel 16B, a transport device 17, the HDD 18, an image processing device 19, an image memory 20, a facsimile communication device 21, and a communication device 22. The display device 15, the touch panel 16B, and the control device 100 constitute a display apparatus 2.

The image reading device 11 is constituted as an automatic document feeder (ADF), including a document feeding device 6 that transports a source document placed on a document table, and a scanner that optically reads the source document transported by the document feeding device 6, or placed on a platen glass 7. The image reading device 11 emits light to the source document from a light emitter, and receives the reflected light with a charge-coupled device (CCD) sensor, to thereby read the source document and generate image data representing the source image.

The image forming device 12 includes a photoconductor drum, a charging device, an exposure device, a developing device, and a transfer device. The image forming device 12 forms an image constituted of a toner image, on a recording sheet P delivered by the transport device 17 along a transport route T, on the basis of the image data generated by the image reading device 11, or inputted through the communication device 22.

The fixing device 13 heats and presses the recording sheet P on which the toner image has been formed by the image forming unit 12, to thereby fix the toner image on the recording sheet P. The recording sheet P having the toner image fixed thereon by the fixing device 13 is delivered to an output tray 8.

The paper feeding device 14 includes a manual bypass tray, and a plurality of paper cassettes. The paper feeding device 14 draws out the recording sheets P stored in one of the plurality of paper cassettes, or placed on the manual bypass tray, with a pickup roller one by one, and delivers the recording sheet P to the transport route T.

The display device 15 is constituted of, for example, a liquid crystal display (LCD) or an organic light-emitting diode (OLED) display. The display device 15 displays, under the control of the controller 10, various types of screens related to the functions that the image forming apparatus 1 is configured to perform, in a display region. In this embodiment, it will be assumed that the shape of the display region of the display device 15 is horizontally long.

The operation device 16 includes a plurality of hard keys, such as a start key 16A for instructing the start of various operations. The operation device 16 also includes a touch panel 16B overlaid on the display device 15. The user inputs various types of information, such as the instruction related to the functions that the image forming apparatus 1 is configured to perform, through the operation device 16.

The transport device 17 includes a transport roller pair 17A and a discharge roller pair 17B, and transport motors electrically connected to the transport roller pair 17A and the discharge roller pair 17B, respectively. The controller 10 drives the transport motors to rotate the transport roller pair 17A and the discharge roller pair 17B, to thereby transport the recording sheet P delivered from the paper feeding device 14, along the transport route T to the image forming device 12 and the output tray 8.

The HDD 18 is a large-capacity storage device for storing various types of data, including the image data generated by the image reading device 11. The HDD 18 contains various control programs to be used to execute basic operations of the image forming apparatus 1. One of the control programs stored in the HDD 18 is the display program, for executing the mobile screen display operation according to the embodiment of the disclosure.

The image processing device 19 executes image processing, as necessary, on the image data generated by the image reading device 11. The image memory 20 includes a region for temporarily storing the image data generated by the image reading device 11. The facsimile communication device 21 is connected to the public telephone network, and transmits and receives image data via the public telephone network.

The communication device 22 includes a communication module such as a local area network (LAN) board. The image forming apparatus 1 can perform data communication, for example with the PC 23 connected via the network, through the communication device 22.

A power source is provided for each of the components of the image forming apparatus 1, so that those components are activated with the poser from the power source.

[Operation of Image Forming Apparatus 1]
(1) When Displaying Home Screen

Figure 3A:
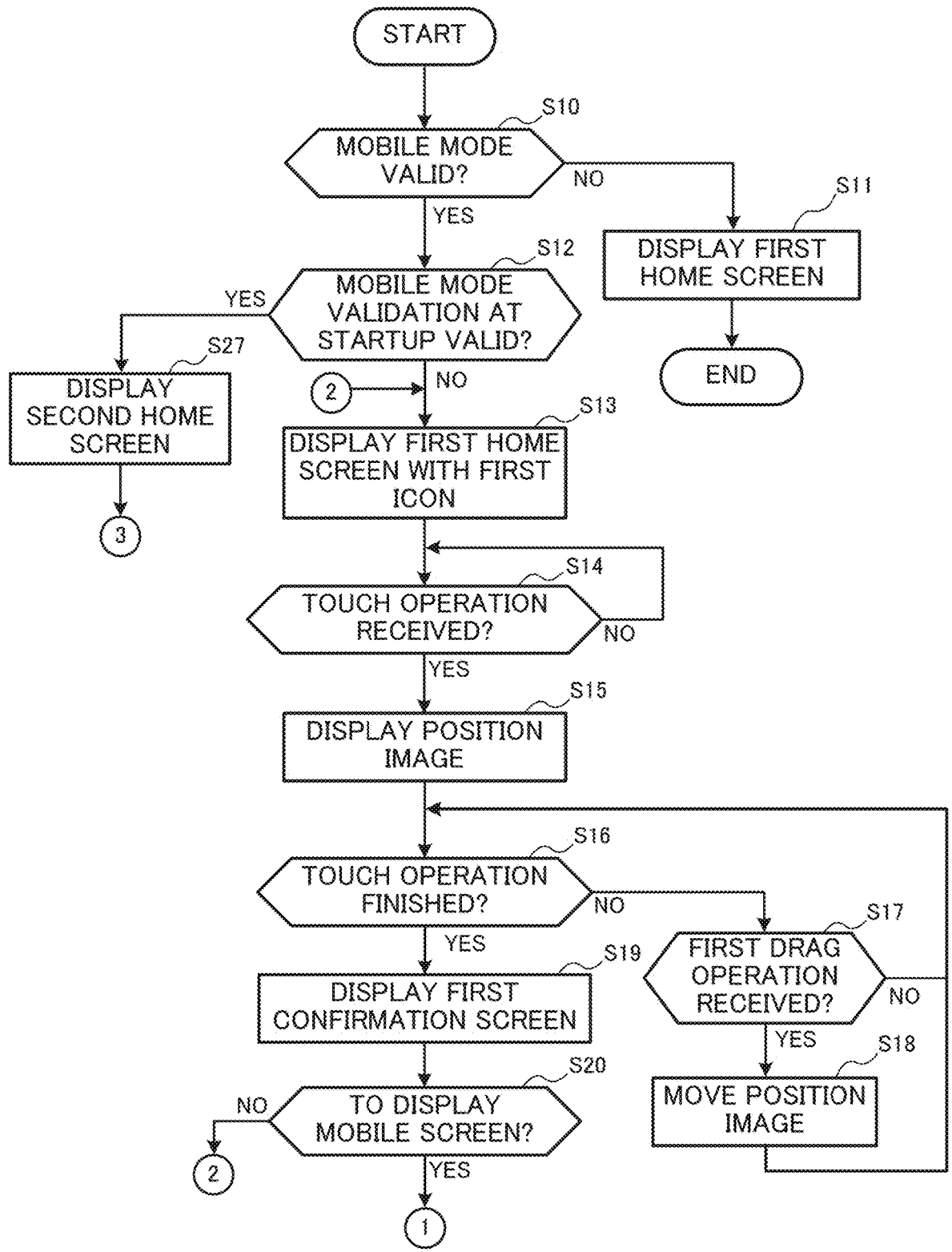
FIG. 3A is a flowchart showing a mobile screen displaying operation.
Figure 3B:
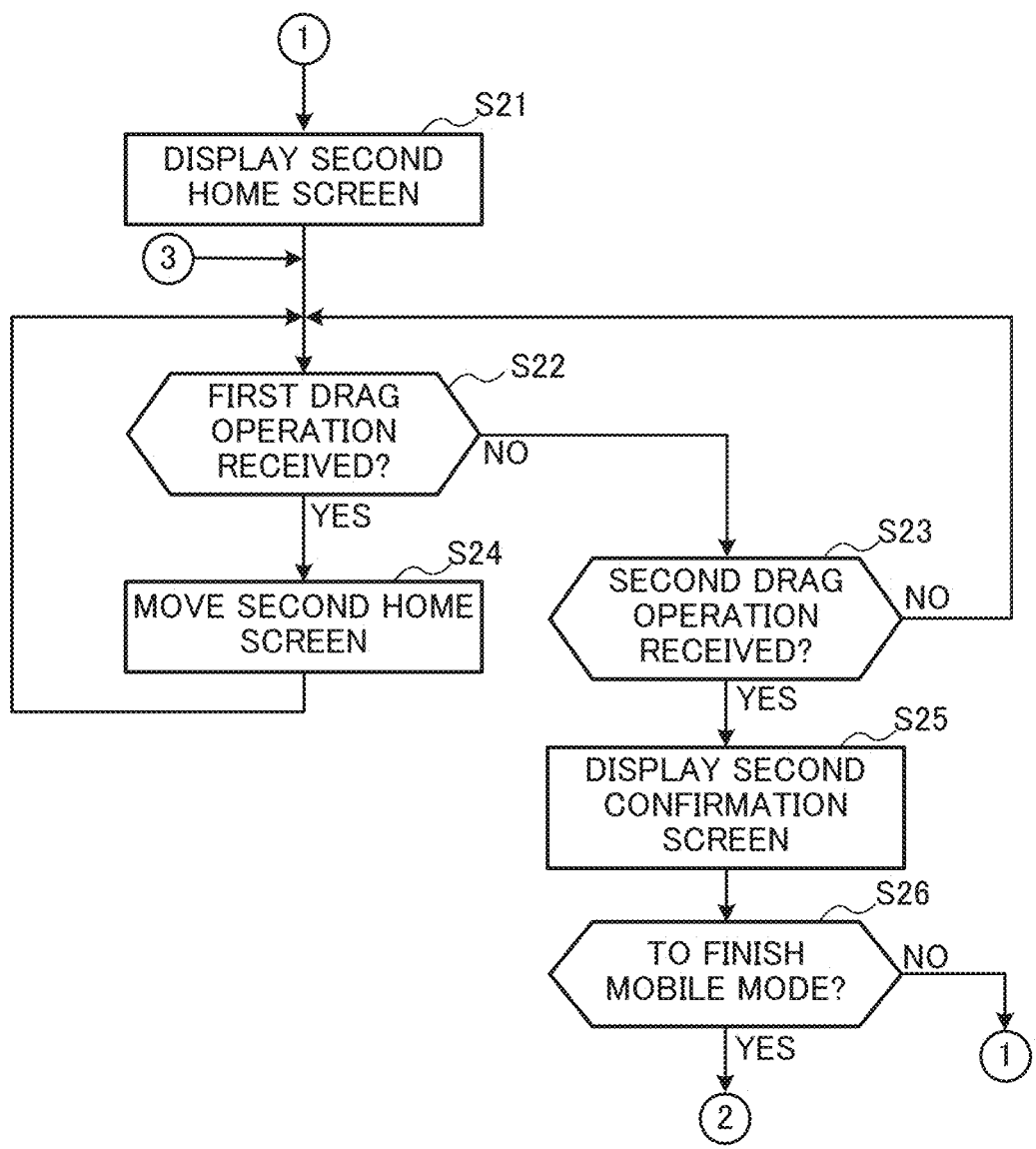
FIG. 3B is a flowchart showing the mobile screen displaying operation subsequent to FIG. 3A.
Figure 4:
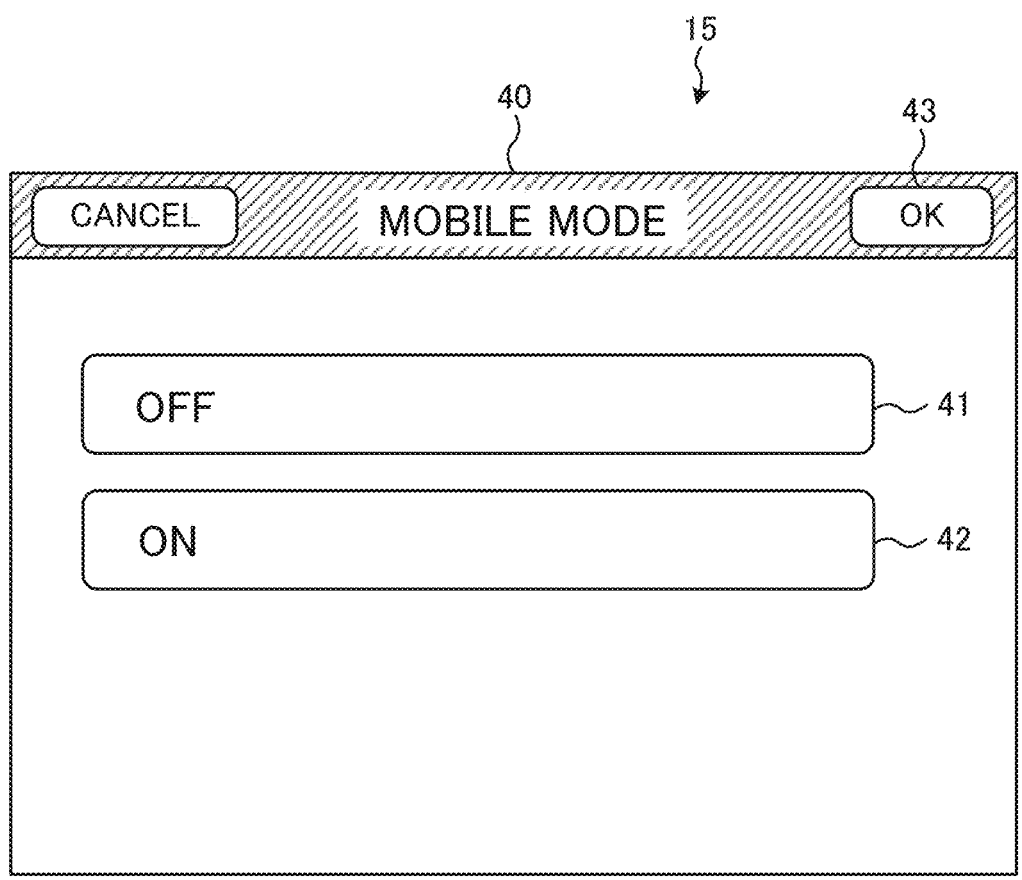
FIG. 4 is a schematic drawing showing an example of a first setting screen.
Figure 5:
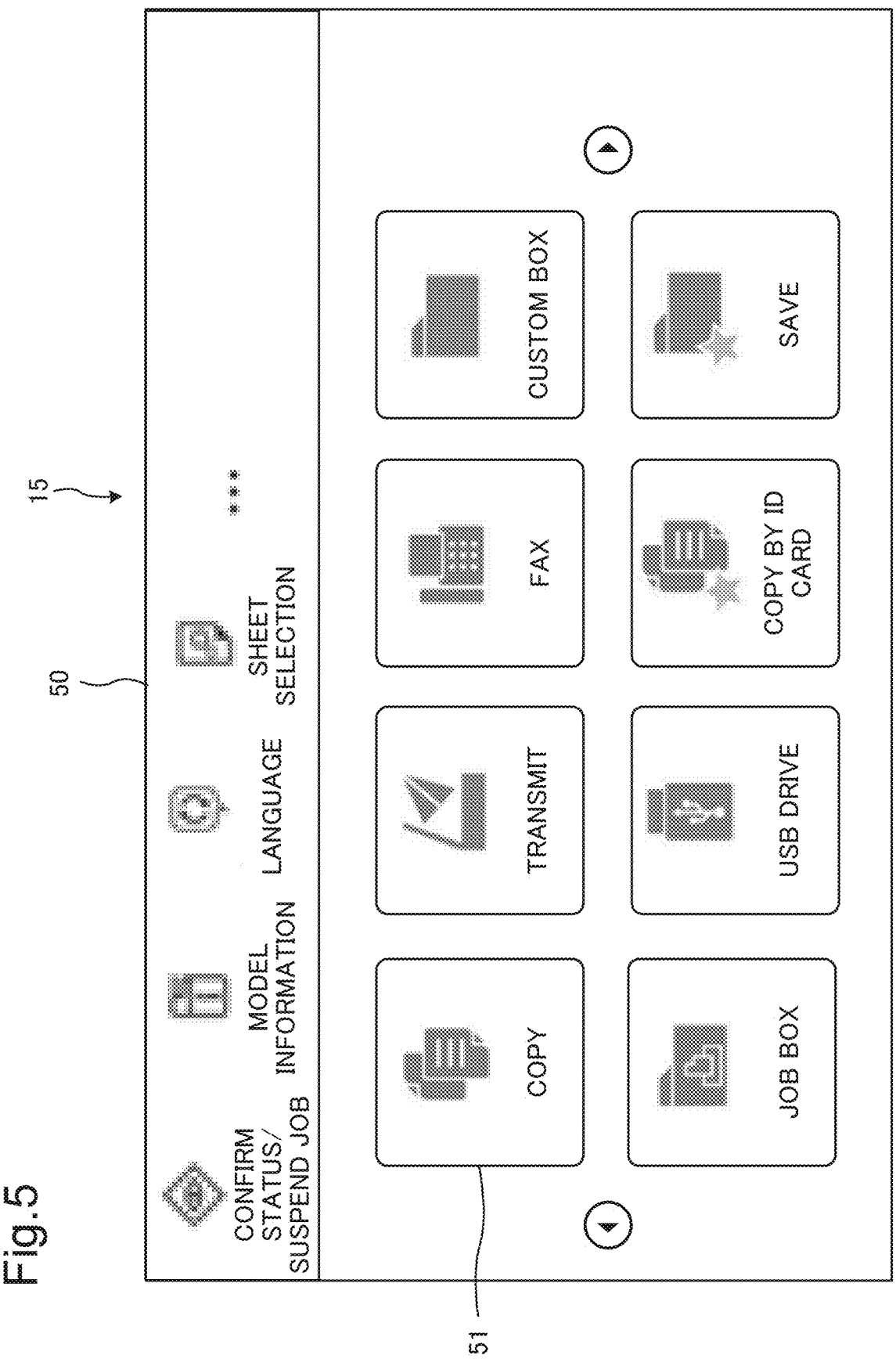
FIG. 5 is a schematic drawing showing an example of a first home screen.
Figure 6:
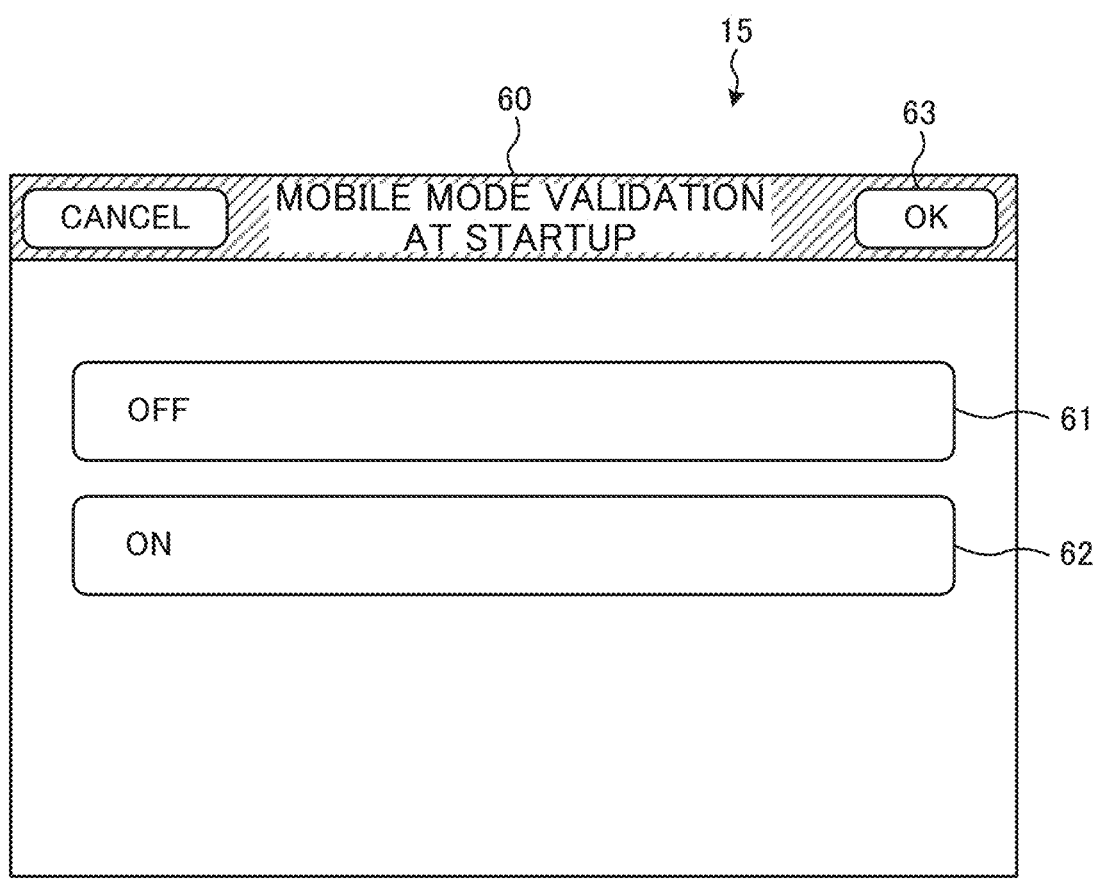
FIG. 6 is a schematic drawing showing an example of a second setting screen.
Figure 7:
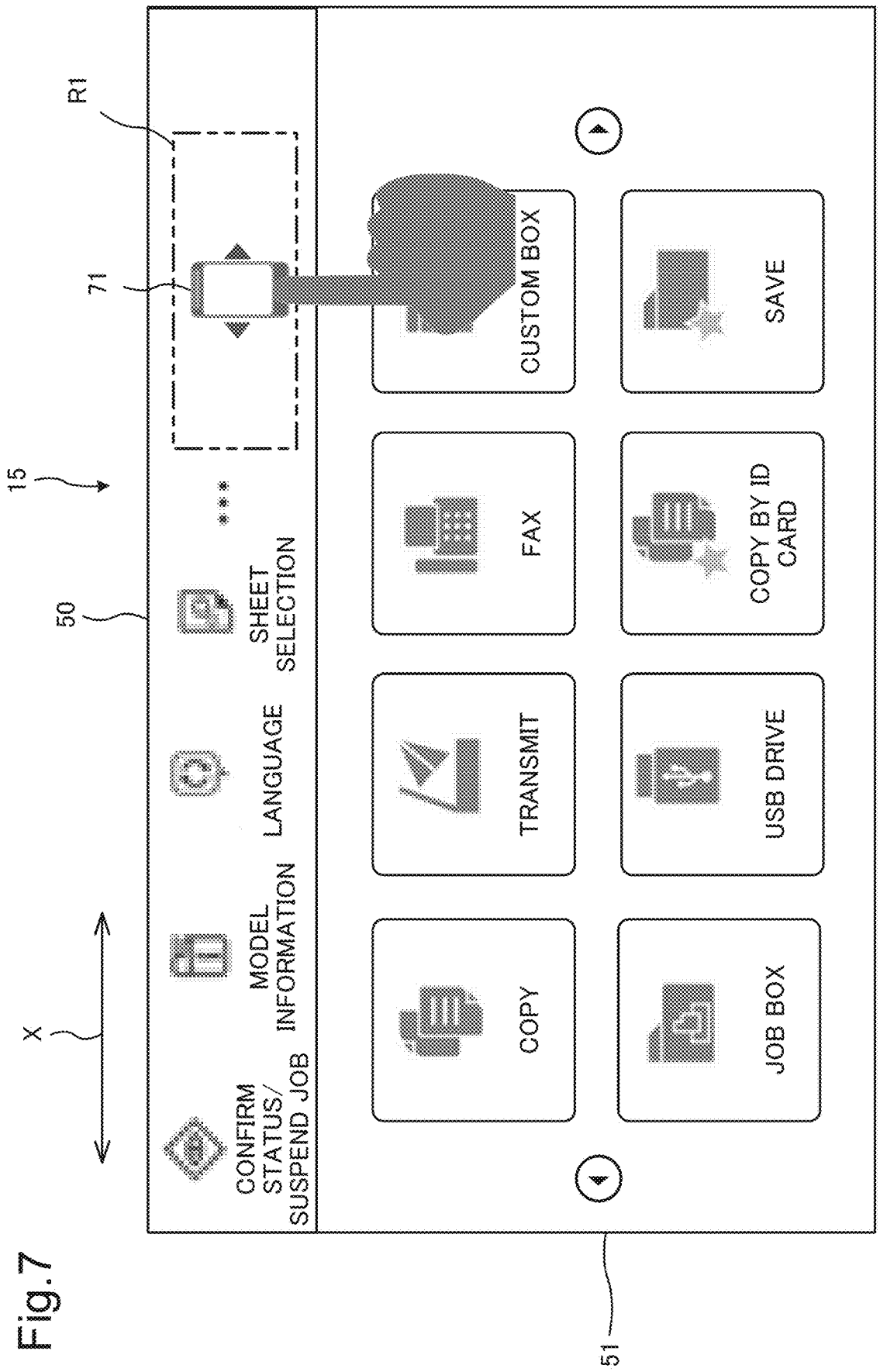
FIG. 7 is a schematic drawing showing an example of the first home screen, with a first icon added.
Figure 8:
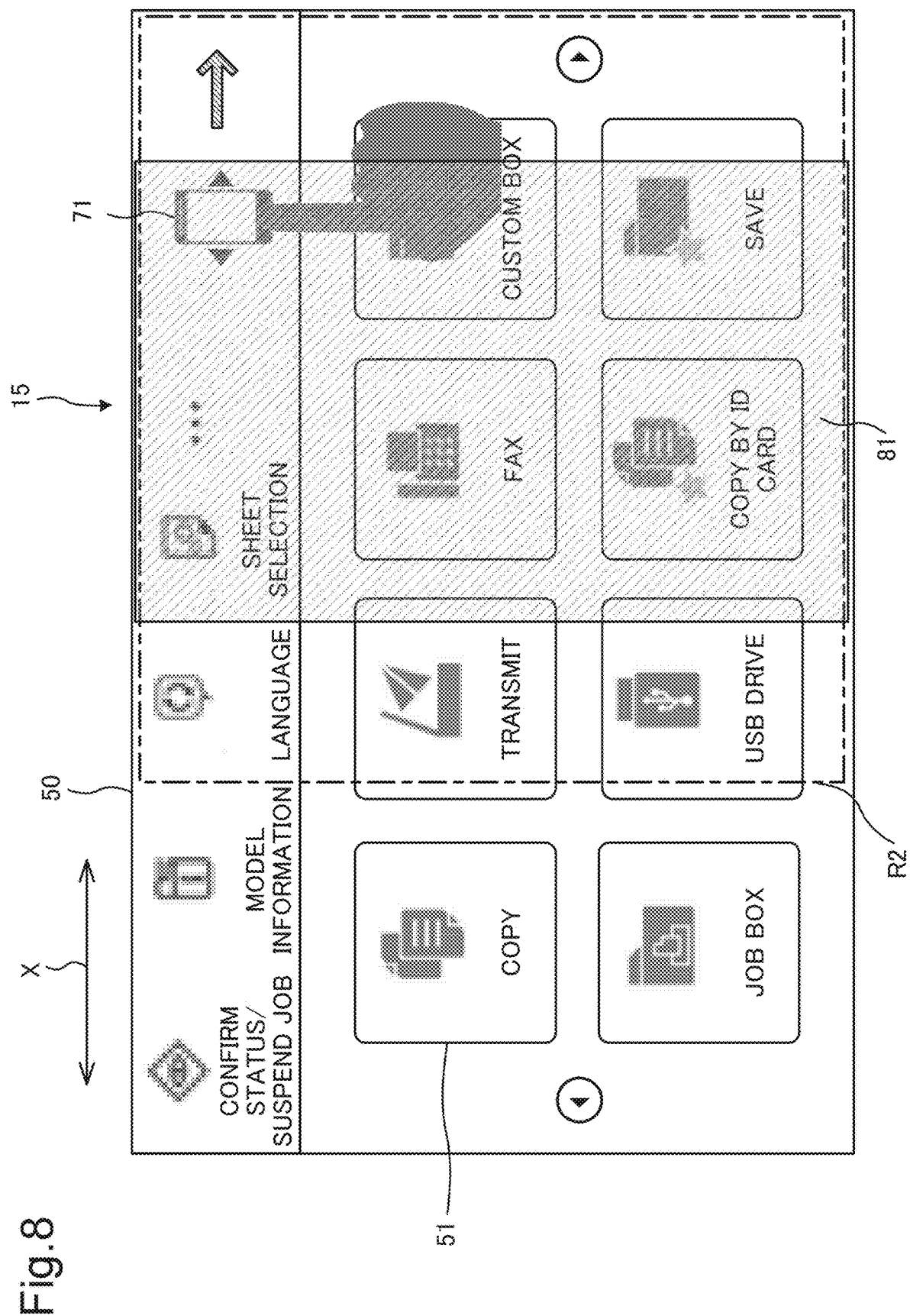
FIG. 8 is a schematic drawing showing an example of a position image.
Figure 9:
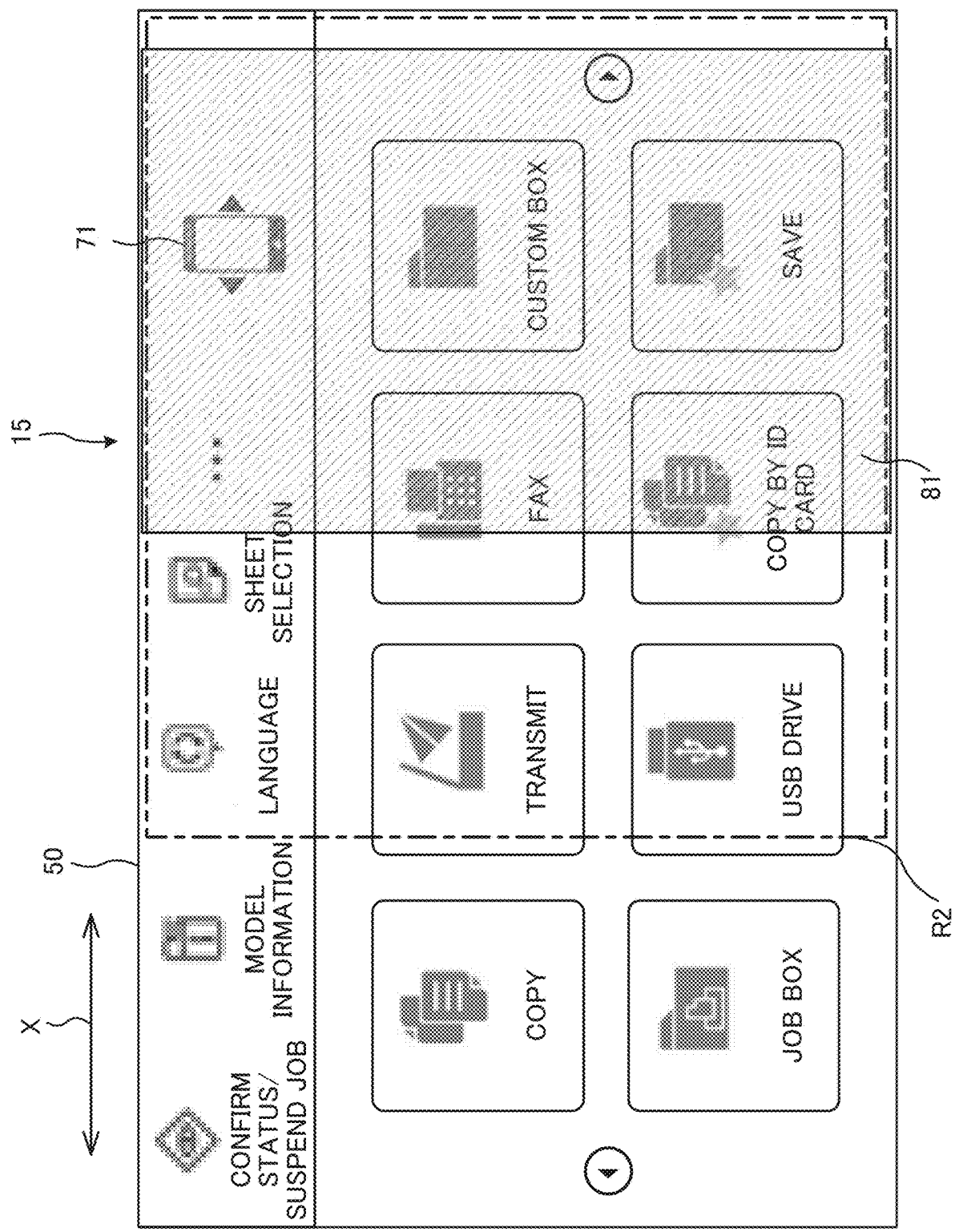
FIG. 9 is a schematic drawing showing the position image that has been moved.
Figure 10:
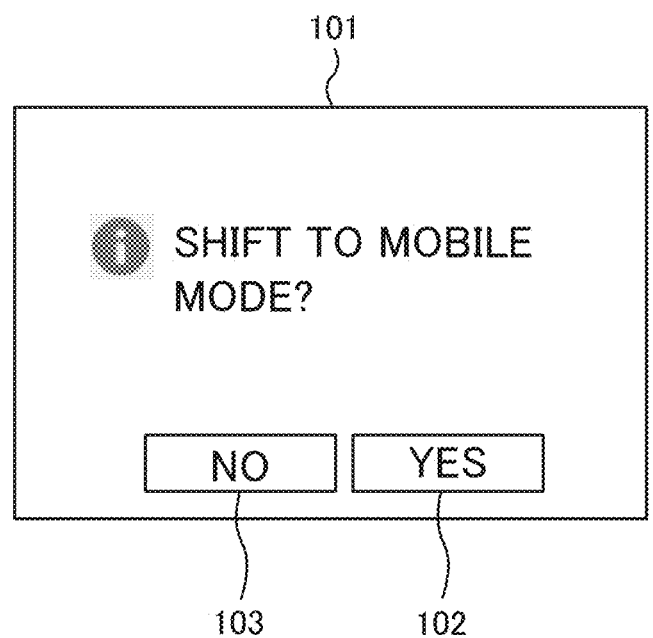
FIG. 10 is a schematic drawing showing an example of a first confirmation screen.
Figure 11:
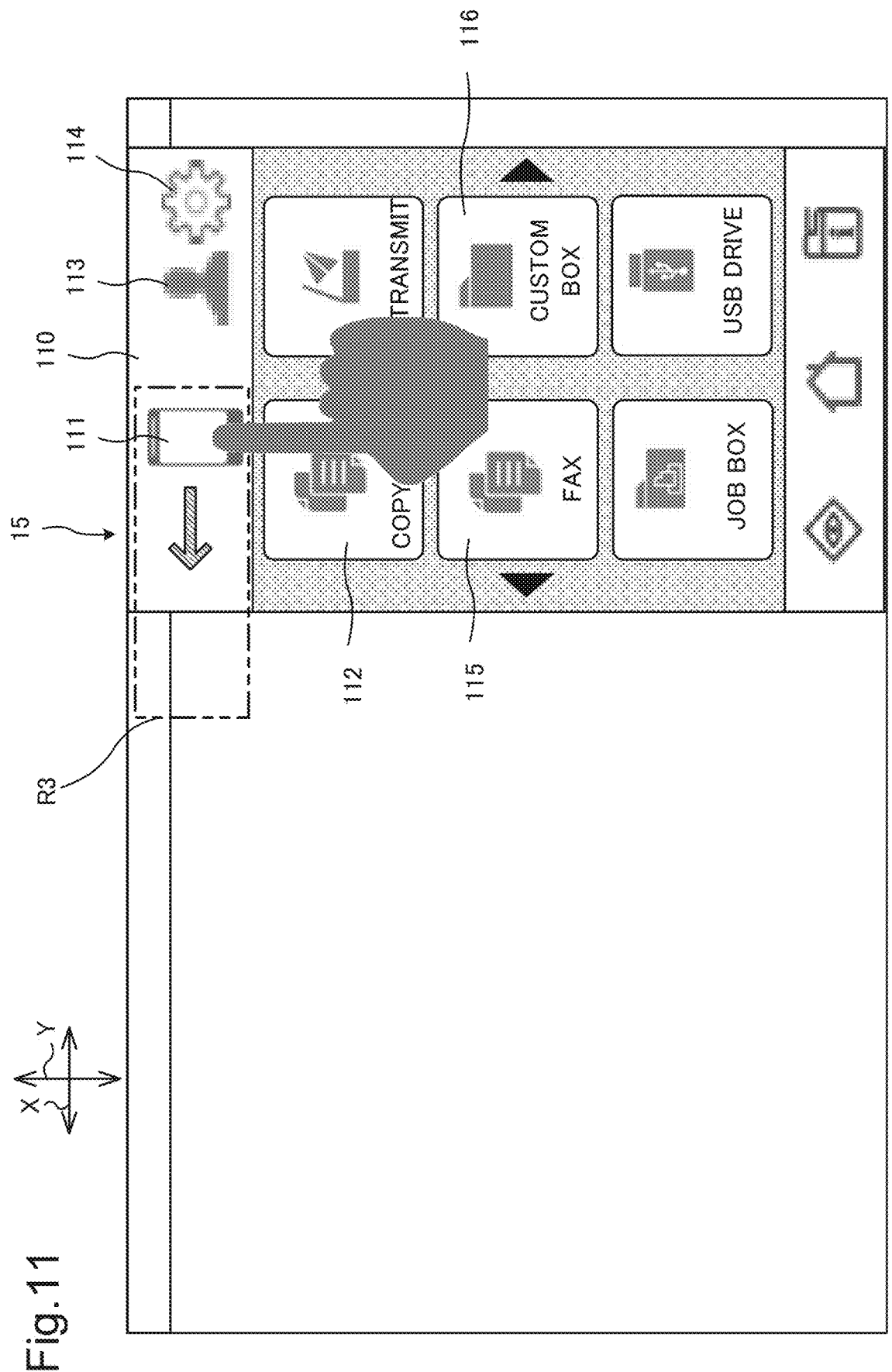
FIG. 11 is a schematic drawing showing an example of a second home screen.
Figure 12:
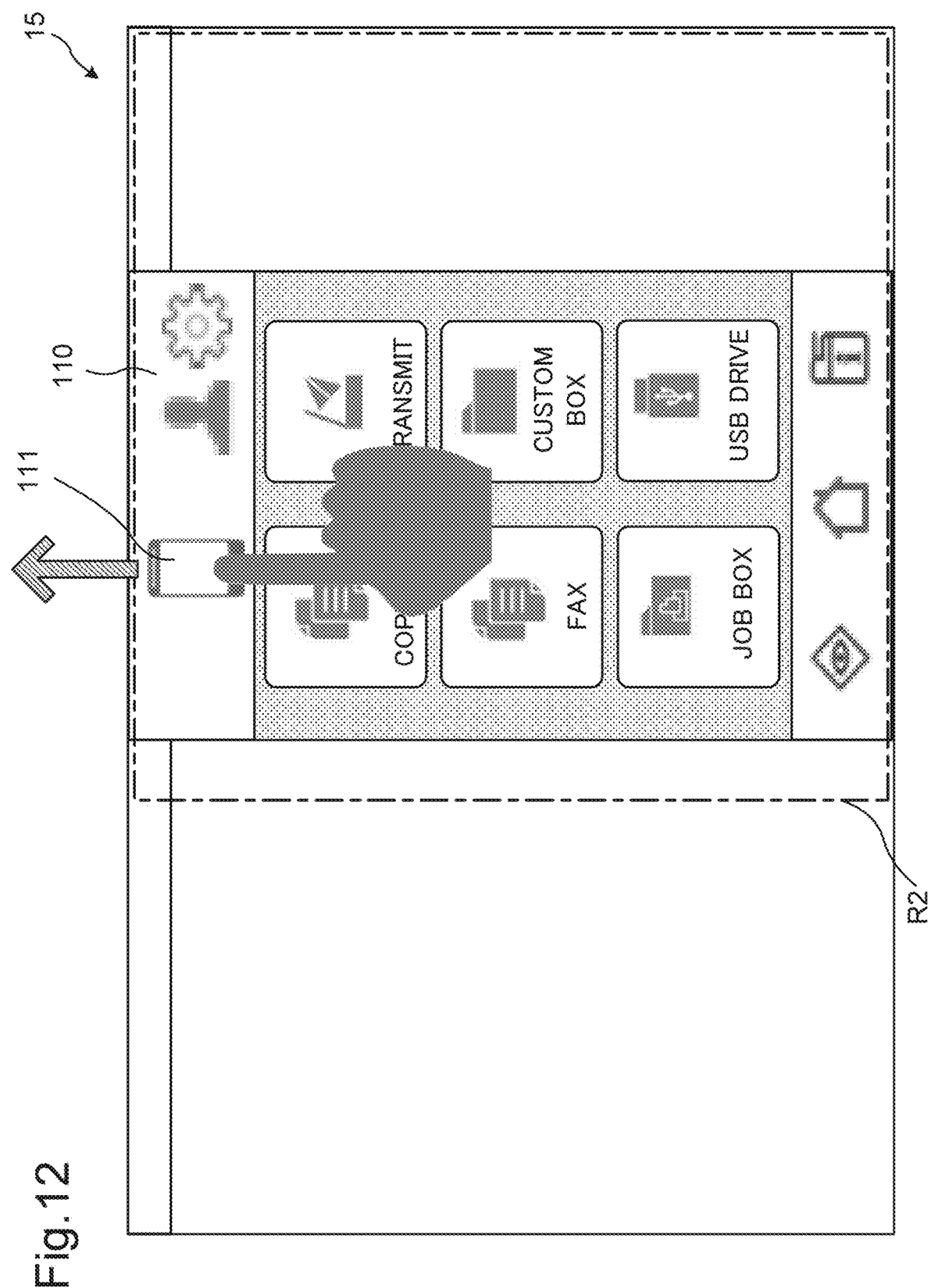
FIG. 12 is a schematic drawing showing the second home screen that has been moved.
Figure 13:
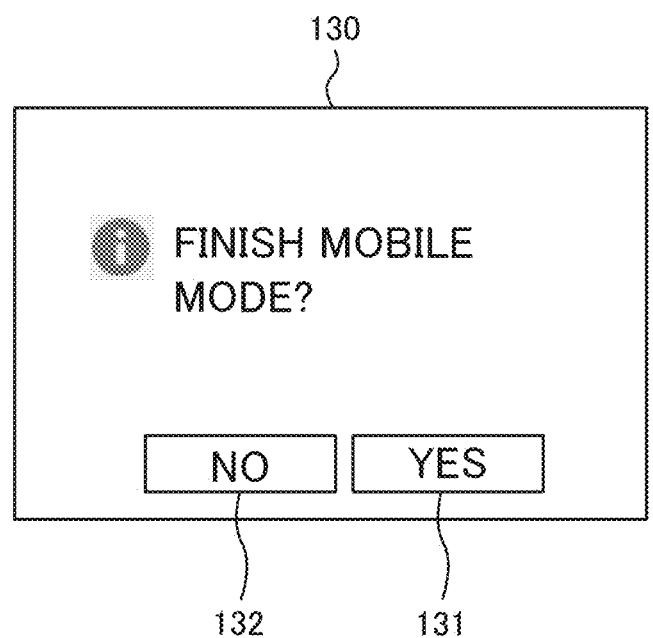
FIG. 13 is a schematic drawing showing an example of a second confirmation screen.

FIG. 3A and FIG. 3B are flowcharts each showing a mobile screen displaying operation. FIG. 4 illustrates an example of a first setting screen. FIG. 5 illustrates an example of a first home screen. FIG. 6 illustrates an example of a second setting screen. FIG. 7 illustrates an example of the first home screen, with a first icon added. FIG. 8 illustrates an example of a position image. FIG. 9 illustrates the position image that has been moved. FIG. 10 illustrates an example of a first confirmation screen. FIG. 11 illustrates an example of a second home screen. FIG. 12 illustrates the second home screen that has been moved. FIG. 13 illustrates an example of a second confirmation screen.

Referring to FIG. 3A to FIG. 13, an operation performed by the image forming apparatus 1 when executing the mobile screen displaying operation will be described hereunder. For the following description, it will be assumed that the appearance and display position of the mobile screen are designed for right-handed users.

When the power to the image forming apparatus 1 is turned on, the controller 10 causes the display device 15 to display a first setting screen 40 including a key 41 for invalidating a mobile mode for displaying the mobile screen, and a key 42 for activating the mobile mode, as shown in FIG. 4.

(1-1) When Mobile Mode is Invalid

It is assumed here that the user has touched the key 41 upon confirming the first setting screen 40, and then touched a key 43 for confirming the selection of the key 41. When the touch panel 16B detects the touch operation performed on the key 43, the controller 10 invalidates the mobile mode, according to the key 41 that has been selected.

Upon invalidating the mobile mode, the controller 10 starts the mobile screen displaying operation shown in FIG. 3A and FIG. 3B, and decides whether the mobile mode is valid (step S10). In this case, the controller 10 decides that the mobile mode is not valid (NO at step S10), and causes the display device 15 to display a first home screen 50, corresponding to the basis screen, as shown in FIG. 5 (step S11). After step S11, the controller 10 finishes the mobile screen displaying operation.

(1-2) When Mobile Mode is Valid

It is assumed here that the user has touched the key 42 upon confirming the first setting screen 40, and then touched the key 43. When the touch panel 16B detects the touch operation performed on the key 43, the controller 10 validates the mobile mode, according to the key 42 that has been selected.

Upon validating the mobile mode, the controller 10 causes the display device 15 to display a second setting screen 60, including a key 61 for invalidating a function to validate the mobile mode from the startup of the image forming apparatus 1 (hereinafter, "mobile mode validation at startup"), and a key 62 for validating the mobile mode validation at startup.

(1-2-1) When Mobile Mode Validation at Startup is Invalid

It is assumed here that the user has touched the key 61 upon confirming the second setting screen 60, and then touched a key 63 for confirming the selection of the key 61. When the touch panel 16B detects the touch operation performed on the key 63, the controller 10 invalidates the mobile mode validation at startup, according to the key 61 that has been selected. Upon invalidating the mobile mode validation at startup, the controller 10 starts the mobile screen displaying operation, and performs the operation of step S10.

In this case, the controller 10 decides that the mobile mode is valid (YES at step S10), and that the mobile mode validation at startup is not valid (NO at step S12), and causes the display device 15 to display the first home screen 50, with a first icon 71 added thereto, as shown in FIG. 7 (step S13).

The first icon 71 is configured to move in a predetermined first direction, in a predetermined region R1, under the control of the controller 10. It is assumed here that the controller 10 has set the first direction to a longitudinal direction X of the display region of the display device 15. After step S13, the controller 10 repeats deciding that a touch operation has not been performed on the first icon 71 (NO at step S14), until the touch panel 16B detects that the first icon 71 has been touched.

When the user touches the first icon 71, the touch panel 16B detects the touch operation, and the controller 10 decides that the first icon 71 has been touched (YES at step S14). The controller 10 then causes the display device 15 to display a position image 81 indicating the displayed position of the mobile screen, at a predetermined position in a predetermined region R2, as shown in FIG. 8 (step S15). In this case, the controller 10 sets the position of the region R2 at one end portion in the longitudinal direction X, as a design for right-handed users.

After step S15, the controller 10 repeatedly decides that the touch operation has not been finished (NO at step S16), and that the touch panel 16B has not received a drag operation on the first icon 71 in the first direction (hereinafter, "first drag operation") (NO at step S17), until the touch panel 16B stops detecting the touch operation on the first icon 71, or detects the first drag operation.

It is assumed here that the user has dragged the first icon 71 in the first direction, toward the one end portion in the longitudinal direction X. When the touch panel 16B detects such drag operation, the controller 10 decides that the first drag operation has been received (YES at step S17), and causes the display device 15 to move the first icon 71 in the first direction in accordance with the moving direction and the travel distance of the first drag operation, and to move the position image 81 in the region R2 in the first direction, as shown in FIG. 9 (step S18). After step S18, the controller 10 proceeds to step S16.

After performing the first drag operation, the user confirms the position of the position image 81, and releases the finger from the first icon 71. When the touch panel 16B stops detecting the touch operation on the first icon 71, the controller 10 decides that the touch operation has been finished (YES at step S16), and causes the display device 15 to display a first confirmation screen 101 including a key 102 for displaying the mobile screen, and a key 103 for keeping the mobile screen from being displayed, as shown in FIG. 10 (step S19).

After step S19, the controller 10 stands by until the touch panel 16B detects a touch operation on the key 102 or key 103. It is assumed here that the user has touched the key 102, in view of the first confirmation screen 101. When the touch panel 16B detects the touch operation on the key 102, the controller 10 decides that an instruction to display the mobile screen has been received (YES at step S20), and causes the display device 15 to display, instead of the first home screen 50, a second home screen 110 serving as the mobile screen, at the position indicated by the position image 81 as shown in FIG. 11 (step S21).

At this point, the controller 10 also causes the display device 15 to display a second icon 111, together with the second home screen 110, in the display region of the display device 15. Here, the second icon 111 is allowed to move in the first direction, under the control of the controller 10, in a predetermined region R3. The second icon 111 is also allowed to move in a predetermined second direction, under the control of the controller 10. It is assumed here that the controller 10 defines the second direction as a short-side direction Y of the display region of the display device 15.

After step S21, the controller 10 repeatedly decides that the first drag operation has not been received (NO at step S22), and that a drag operation on the second icon 111 in the second direction (hereinafter, "second drag operation") (NO at step S23), until the first drag operation on the second icon 111, or the second drag operation on the second icon 111 is received.

It is assumed here that the user has dragged the second icon 111 in the first direction, toward the other end portion in the longitudinal direction X. When the touch panel 16B detects such drag operation, the controller 10 decides that the first drag operation has been received (YES at step S22), and causes the display device 15 to move the second icon 111 in the first direction in accordance with the moving direction and the travel distance of the first drag operation, and to move the second home screen 110 in the region R2 in the first direction, as shown in FIG. 12 (step S24). After step S24, the controller 10 proceeds to step S22.

It is assumed here that, after performing the first drag operation on the second icon 111, the user drags the second icon 111 in the second direction, toward an end portion in the short-side direction Y. When the touch panel 16B detects such drag operation, the controller 10 decides that the second drag operation has been received (YES at step S23), and causes the display device 15 to move the second icon 111 in the second direction, and to display a second confirmation screen 130 including a key 131 for finishing the display of the mobile screen, and a key 132 for maintaining the mobile screen, as shown in FIG. 13 (step S25).

After step S25, the controller 10 stands by until the touch panel 16B detects a touch operation on the key 131 or key 132. It is assumed here that the user has touched the key 131, in view of the second confirmation screen 130. When the touch panel 16B detects the touch operation on the key 131, the controller 10 decides that an instruction to finish the display of the mobile screen has been received (YES at step S26), and proceeds to step S13.

In the case where the user touches the key 132, and the touch panel 16B detects the touch operation on the key 132, the controller 10 decides that the instruction to maintain the display of the mobile screen has been received (NO at step S26), and proceeds to step S21.

Here, in the case where the user touches the key 103 in the first confirmation screen 101, and the touch panel 16B detects the touch operation on the key 103, the controller 10 decides that the instruction to keep the mobile screen from being displayed has been received (NO at step S20), and proceeds to step S13.

(1-2-2) When Mobile Mode Validation at Startup is Valid

It is assumed here that, after validating the mobile mode as above, the user selects the key 62 upon confirming the second setting screen 60, and then touches the key 63. When the touch panel 16B detects the touch operation on the key 63, the controller 10 validates the mobile mode validation at startup, according to the key 62 that has been selected.

Upon validating the mobile mode validation at startup, the controller 10 starts to execute the mobile screen displaying operation, and proceeds to step S10. In this case, the controller 10 decides that the mobile mode is valid (YES at step S10), and that the mobile mode validation at startup is also valid (YES at step S12), and causes the display device 15 to display the second home screen 110, at a predetermined position in the region R2 (step S27). After step S27, the controller 10 proceeds to step S22.

(2) When Forming Image

Figure 14:
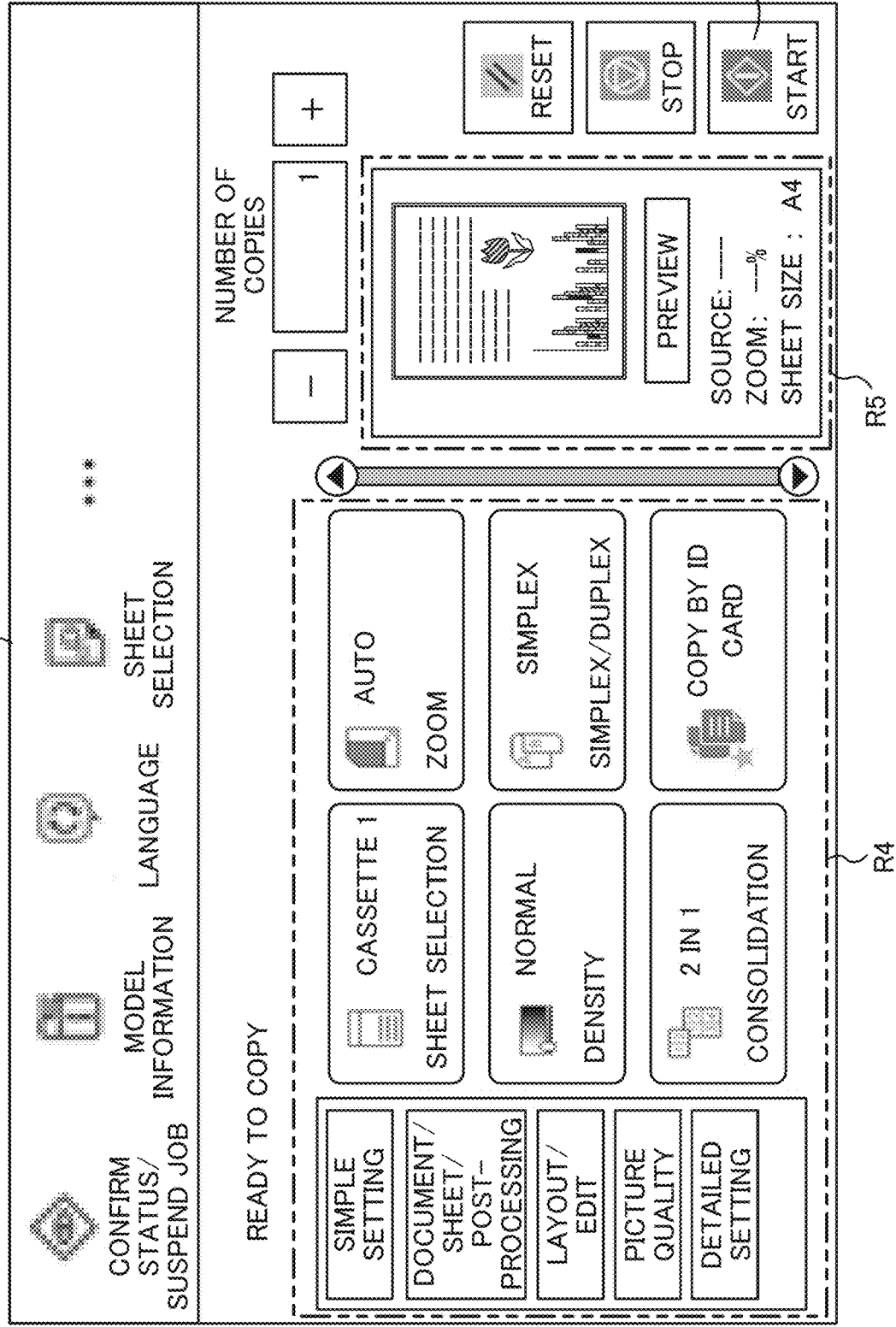
FIG. 14 is a schematic drawing showing an example of a first copy screen.
Figure 15:
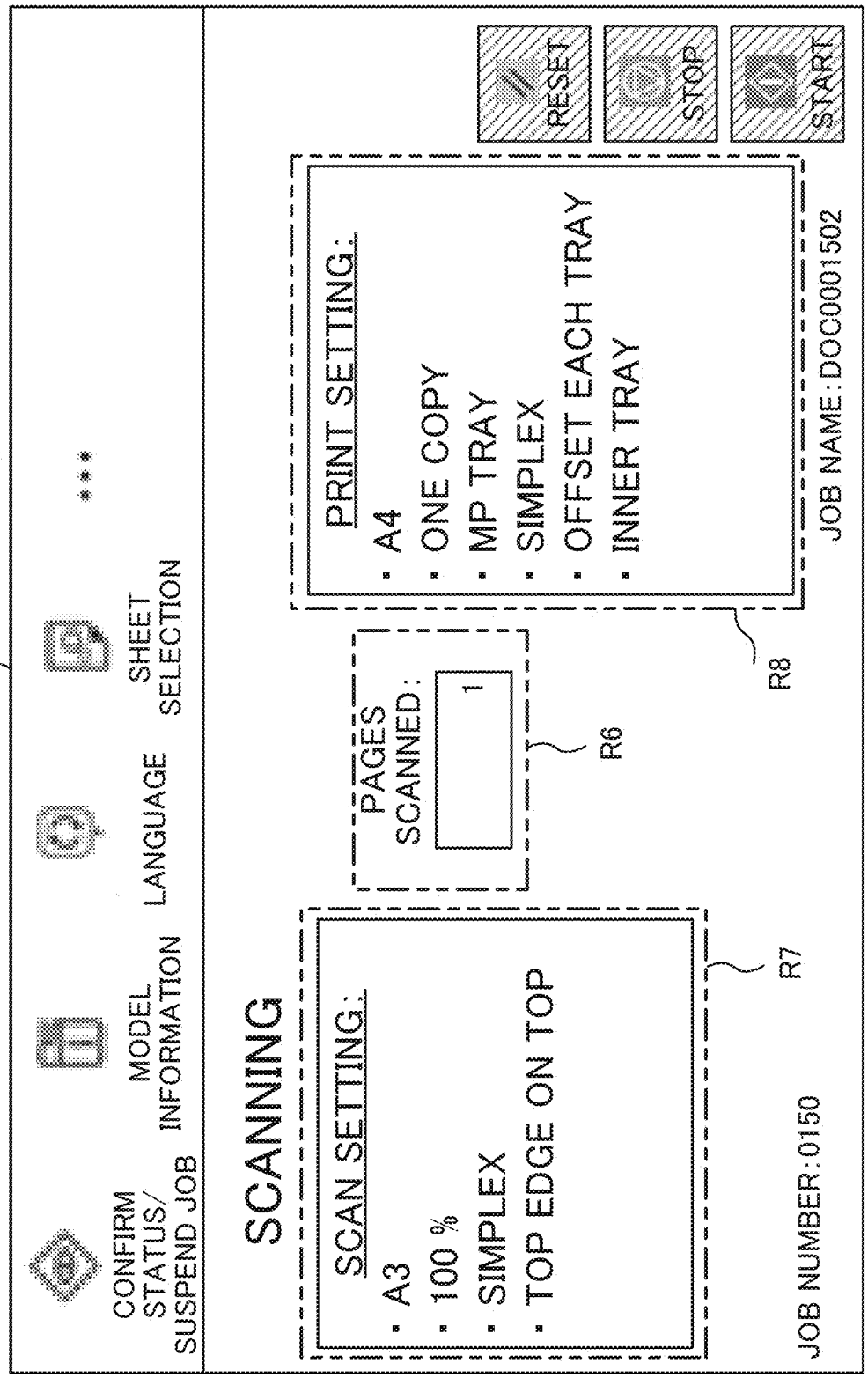
FIG. 15 is a schematic drawing showing an example of a first notice screen.
Figure 16:
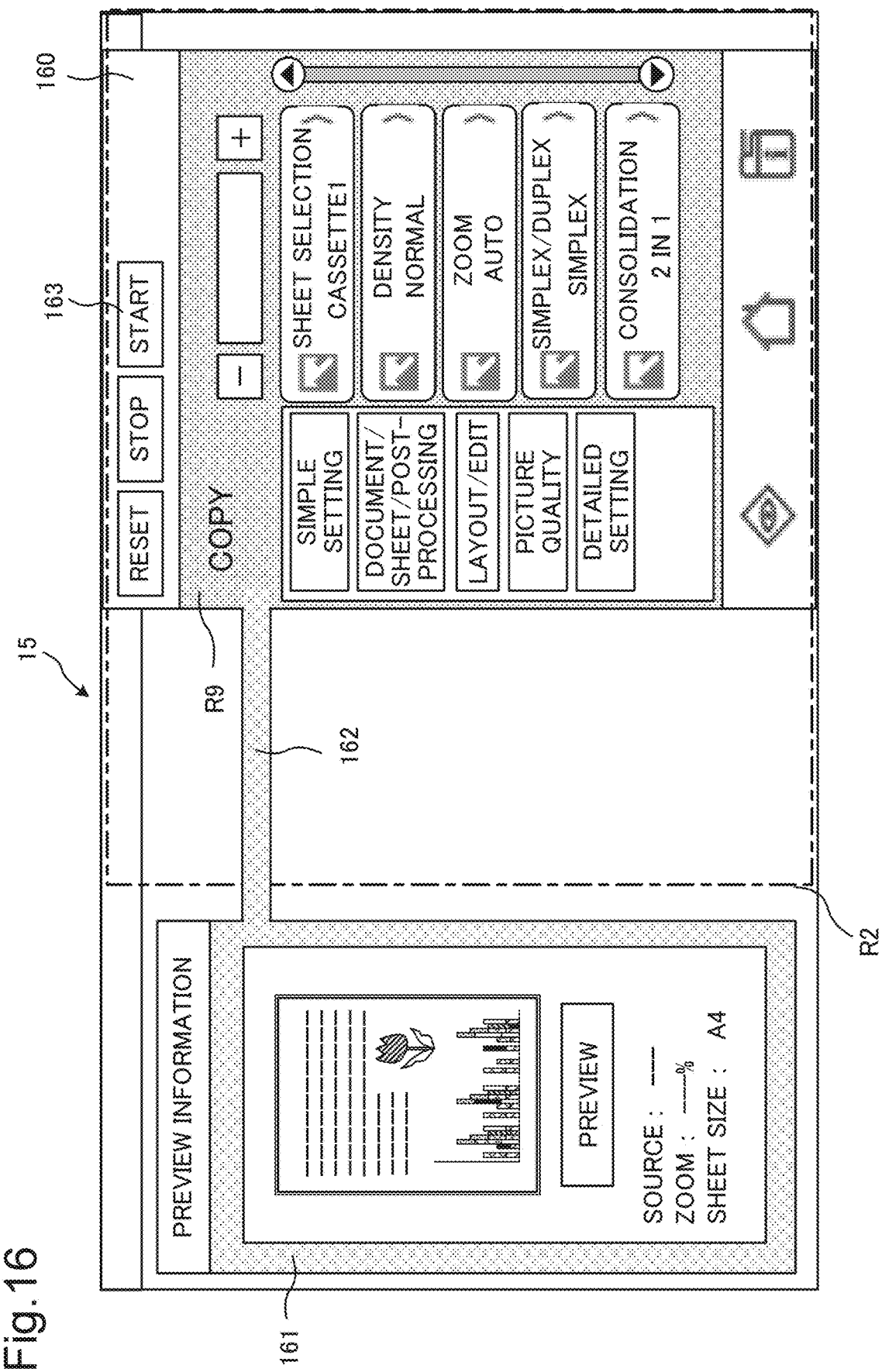
FIG. 16 is a schematic drawing showing an example of a second copy screen and a preview screen.
Figure 17:
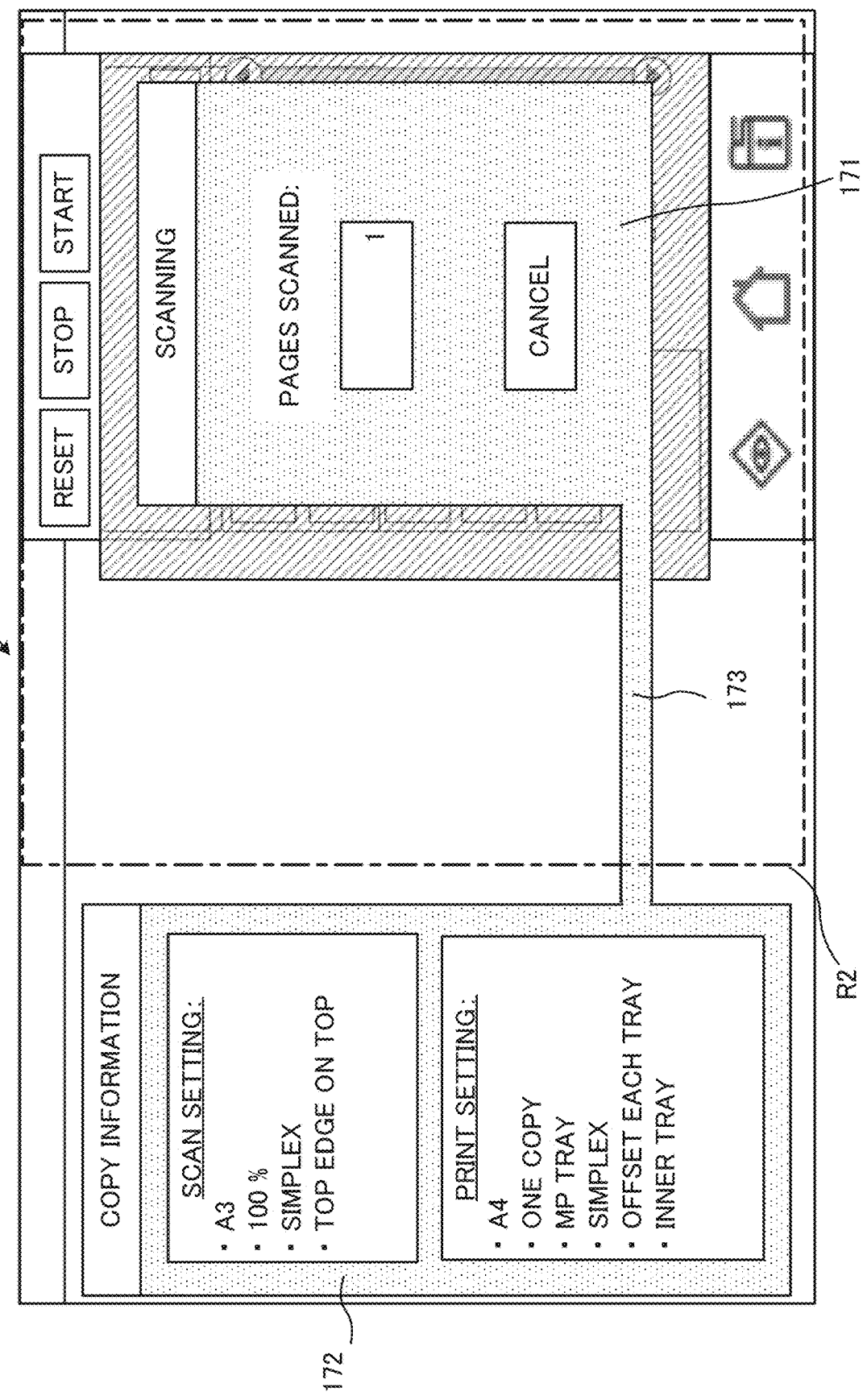
FIG. 17 is a schematic drawing showing an example of a second notice screen and a third notice screen.

FIG. 14 illustrates an example of a first copy screen. FIG. 15 illustrates an example of a first notice screen. FIG. 16 illustrates an example of a second copy screen and a preview screen. FIG. 17 illustrates an example of a second notice screen and a third notice screen. Referring to FIG. 14 to FIG. 17, an operation of the image forming apparatus 1, performed for the image forming operation, will be described hereunder.

(2-1) When Displaying Basic Screen

The controller 10 causes the display device 15 to display the first home screen 50, as shown in FIG. 5. The user touches a key 51 corresponding to the copying function, among a plurality of function keys included in the first home screen 50, respectively corresponding to the plurality of functions that the image forming apparatus 1 is configured to perform. When the touch panel 16B detects the touch operation on the key 51, the controller 10 causes the display device 15 to display, as shown in FIG. 14, a first copy screen 140 serving as the basic screen, instead of the first home screen 50.

The controller 10 causes the display device 15 to display a plurality of item keys, respectively corresponding to a plurality of items to be set related to the copying function, in a region RA of the first copy screen 140. The controller 10 also causes the display device 15 to display information about a preview image, in a region R5 of the first copy screen 140. After touching the key 51, the user places a source document on the platen glass 7, and touches a start key 141 in the first copy screen 140.

When the touch panel 16B detects the touch operation on the start key 141, the controller 10 starts to execute the image forming operation. First, the controller 10 causes the image reading device 11 to read the source document placed on the platen glass 7, and generate the image data representing the source image. When the image data is generated, the controller 10 causes the image forming device 12 to form the source image represented by the image data, on the recording sheet P.

During the execution of the image forming operation the controller 10 causes the display device 15 to display a first notice screen 150 serving as the basic screen, as shown in FIG. 15. More specifically, the controller 10 causes the display device 15 to display information about the progress of the image forming operation in a region R6 in the first notice screen 150, and information indicating setting detail related to the image forming operation, in a region R7 and a region R8 in the first notice screen 150.

(2-2) When Displaying Mobile Screen

The controller 10 causes the display device 15 to display the second home screen 110, as shown in FIG. 11. The user touches a key 112 corresponding to the copying function, among a plurality of function keys included in the second home screen 110, respectively corresponding to the plurality of functions that the image forming apparatus 1 is configured to perform.

When the touch panel 16B detects the touch operation on the key 112, the controller 10 causes the display device 15 to display, as shown in FIG. 16, a second copy screen 160 serving as the mobile screen, at the position in the region R2 where the second home screen 110 has thus far been displayed, and a preview screen 161 representing information about the preview image, in region other than the region R2. At this point, the controller 10 causes the display device 15 to display a line image 162 connecting a region R9 including a character string "COPY" in the second copy screen 160, and a preview screen 161 showing the copying result.

After touching the key 112, the user places a source document on the platen glass 7, and touches a start key 163 in the second copy screen 160. When the touch panel 16B detects the touch operation on the start key 163, the controller 10 executes the image forming operation, as described above.

During the execution of the image forming operation, the controller 10 causes the display device 15 to display, as shown in FIG. 17, a second notice screen 171 serving as the mobile screen indicating the progress of the image forming operation, at the position in the region R2 where the second copy screen 160 has thus far been displayed, and a third notice screen 172 indicating the setting detail related to the image forming operation, in a region other than the region R2. At the same time, the controller 10 causes the display device 15 to display a line image 173 connecting the second notice screen 171 and the third notice screen 172.

Now, with the aforementioned known technique, the user has to rotate the operation panel, in order to switch the screen, and therefore the user may fail to smoothly switch the screen.

With the arrangement according to the foregoing embodiment, in contrast, the controller 10 causes the display device 15 to display the first home screen 50, with the first icon 71 added thereto. When the touch panel 16B detects a predetermined operation performed on the first icon 71, the controller 10 causes the display device 15 to display the second home screen 110 in the region R2, instead of the first home screen 50.

As described above, the user can switch the display from the first home screen 50 to the second home screen 110, by performing the predetermined operation on the first icon 71. Therefore, the user can easily switch the display from the first home screen 50 to the second home screen 110. In addition, switching from the first home screen 50, which is larger in size, to the second home screen 110 which is smaller in size allows the travel distance of the user's finger for operating the screen to be shortened, thereby improving the operability for the user.

According to the foregoing embodiment, when the touch panel 16B detects the touch operation on the first icon 71, the controller 10 causes the display device 15 to display the position image 81 in the region R2. When the touch panel 16B detects the first drag operation on the first icon 71, the controller 10 causes the display device 15 to move the first icon 71 in the first direction in accordance with the moving direction and the travel distance of the first drag operation, and to move the position image 81 in the first direction, in the region R2. When the touch panel 16B stops detecting the touch operation on the first icon 71, the controller 10 causes the display device 15 to display the second home screen 110 instead of the first home screen 50, at the position indicated by the position image 81.

Thus, the user can switch the display from the first home screen 50 to the second home screen 110, by touching the first icon 71, and change the display position of the second home screen 110, by performing the first drag operation on the first icon 71. Therefore, the user can switch the screen from the first home screen 50 to the second home screen 110, and change the display position of the second home screen 110, easily and intuitively. As result, user-friendliness of the device can be further improved.

According to the foregoing embodiment, the controller 10 causes the display device 15 to display the second icon 111 together with the second home screen 110, in the display region. When the touch panel 16B detects the first drag operation on the second icon 111, the controller 10 causes the display device 15 to move the second icon 111 in the first direction in accordance with the moving direction and the travel distance of the first drag operation, and to move the second home screen 110 in the first direction, in the region R2.

As described above, the user can change the display position of the second home screen 110, by performing the first drag operation on the second icon 111. Therefore, the user can change the display position of the second home screen 110, easily and intuitively.

According to the foregoing embodiment, further, when the touch panel 16B detects the second drag operation on the second icon 111, the controller 10 causes the display device 15 to display the first home screen 50, with the first icon 71 added thereto, in the display region instead of the second home screen 110.

As described above, the user can switch the display from the second home screen 110 to the first home screen 50, by performing the second drag operation on the second icon 111. Therefore, the user can also switch the display from the second home screen 110 to the first home screen 50 easily and intuitively, in addition to changing the display position of the second home screen 110.

Further, since the mobile screen is of a vertically long shape in the predetermined size that fits the size of the user's hand, the user-friendliness of the device can be further improved.

According to the foregoing embodiment, further, the controller 10 causes the display device 15 to display, for example, the second copy screen 160 in the region R2, and the preview screen 161 representing the information related to a part of the display content of the second copy screen 160, in the region other than the region R2. The controller 10 also causes the display device 15 to display the line image 162 connecting the region R9 including the character string "COPY", which is a part of the content of the second copy screen 160, and the preview screen 161 showing the copying result.

Accordingly, the user can easily recognize to which information in the second copy screen 160 the preview screen 161 is related, in view of the line image 162. In addition, since the second copy screen 160 is displayed in the region R2, and the preview screen 161 is displayed in the region other than the region R2, the display regions of the display device 15 can be effectively utilized, and the displayed content can be prevented from becoming difficult to recognize, because of an overlapping display of the second copy screen 160 and the preview screen 161.

In the foregoing embodiment, the controller 10 causes the display device 15 to display the second confirmation screen 130, when the second drag operation, exemplifying the predetermined operation, is performed on the second icon 111. However, the disclosure is not limited to such an arrangement. For example, the controller 10 may cause the display device 15 to display the second confirmation screen 130, when the second icon 111 has been touched for equal to or longer than a predetermined time (e.g., three seconds).

In the foregoing embodiment, in addition, the controller 10 causes the display device 15 to display the position image 81 at the predetermined position in the region R2 at step S15, and display the second home screen 110 at the predetermined position in the region R2 at step S27. However, the disclosure is not limited to such an arrangement. For example, the controller 10 may store coordinate information indicating the position of the immediately preceding mobile screen in the HDD 18, and cause the display device 15 to display the position image 81 or the second home screen 110, at the position in the region R2 indicated by the coordinate information.

[First Variation]

Although the controller 10 locates the region R2 at the one end portion in the longitudinal direction X in the foregoing embodiment, the disclosure is not limited to such an arrangement. In a first variation of the foregoing embodiment, the controller 10 changes the position of the region R2, when a predetermined condition is satisfied.

Figure 18:
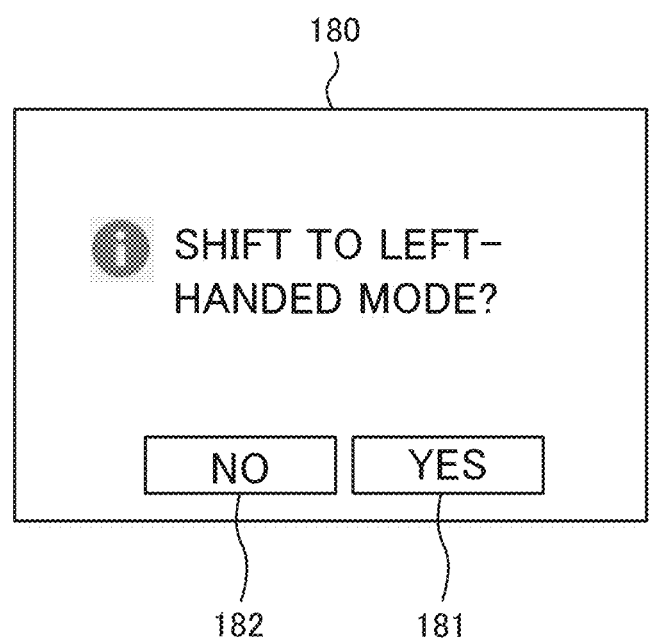
FIG. 18 is a schematic drawing showing an example of a third confirmation screen.
Figure 19:
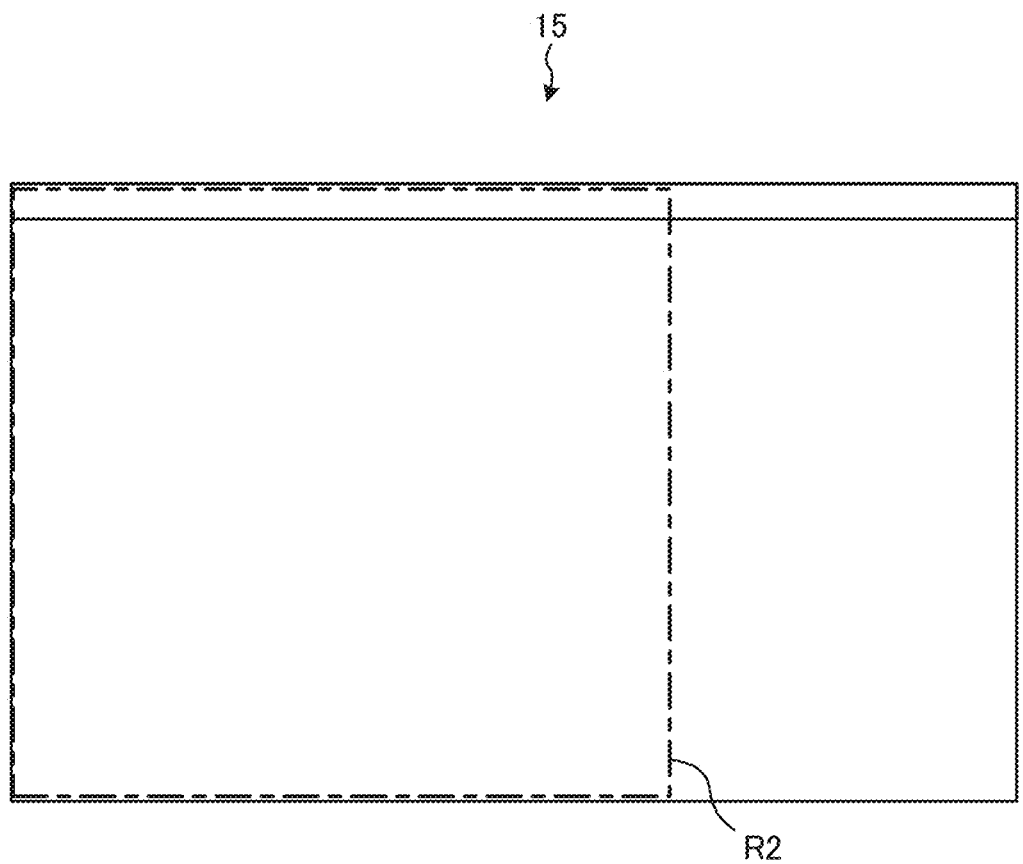
FIG. 19 is a schematic drawing showing a predetermined region located at a changed position.

FIG. 18 illustrates an example of a third confirmation screen. FIG. 19 illustrates the changed position of the region R2. Referring to FIG. 18 and FIG. 19, an operation of the image forming apparatus 1 according to the first variation will be described hereunder.

In the first variation, when the controller 10 decides that the position image 81 or the second home screen 110 moves beyond the borderline of the region R2 on the side of the other end portion in the longitudinal direction X, because of being moved in accordance with the moving direction and the travel distance of the first drag operation, performed when the region R2 is located on the side of the one end portion, the controller 10 causes the display device 15 to display, as shown in FIG. 18, the third confirmation screen 180 including a key 181 for changing the position of the region R2, and a key 182 for keeping the position of the region R2 unchanged.

It is assumed here that the user touches the key 181, in view of the third confirmation screen 180. When the touch panel 16B detects the touch operation on the key 181, the controller 10 locates the region R2 on the side of the other end portion in the longitudinal direction X, as shown in FIG. 19, as a design for left-handed users. At the same time, the controller 10 causes the display device 15 to move the position image 81 or the second home screen 110, on which the first drag operation has been performed, in the first direction, in accordance with the moving direction and the travel distance of the first drag operation.

In contrast, when the user touches the key 182 in view of the third confirmation screen 180, and the touch panel 16B detects the touch operation on the key 182, the controller 10 keeps the position of the region R2 unchanged from the one end portion in the longitudinal direction X. In this case, the controller 10 restricts the display device 15 from moving the position image 81 or the second home screen 110, in accordance with the moving direction and the travel distance of the first drag operation.

Here, when the controller 10 decides that the position image 81 or the second home screen 110 moves beyond the borderline of the region R2 on the side of the one end portion in the longitudinal direction X, because of being moved in accordance with the moving direction and the travel distance of the first drag operation, performed when the region R2 is located on the side of the other end portion, and the touch panel 16B detects the touch operation on the key 181, the controller 10 locates the region R2 on the side of the one end portion in the longitudinal direction X.

With the arrangement according to the first variation, the user can change the position of the region R2 for displaying the mobile screen, simply by performing the first drag operation on the first icon 71 or the second icon 111. In addition, the controller 10 can determine the position of the region R2, without the need to employ a sensor for detecting the situation of the user's hand, such as whether the user is using the right hand or left hand, and therefore the structure of the device can be simplified.

Figure 20:
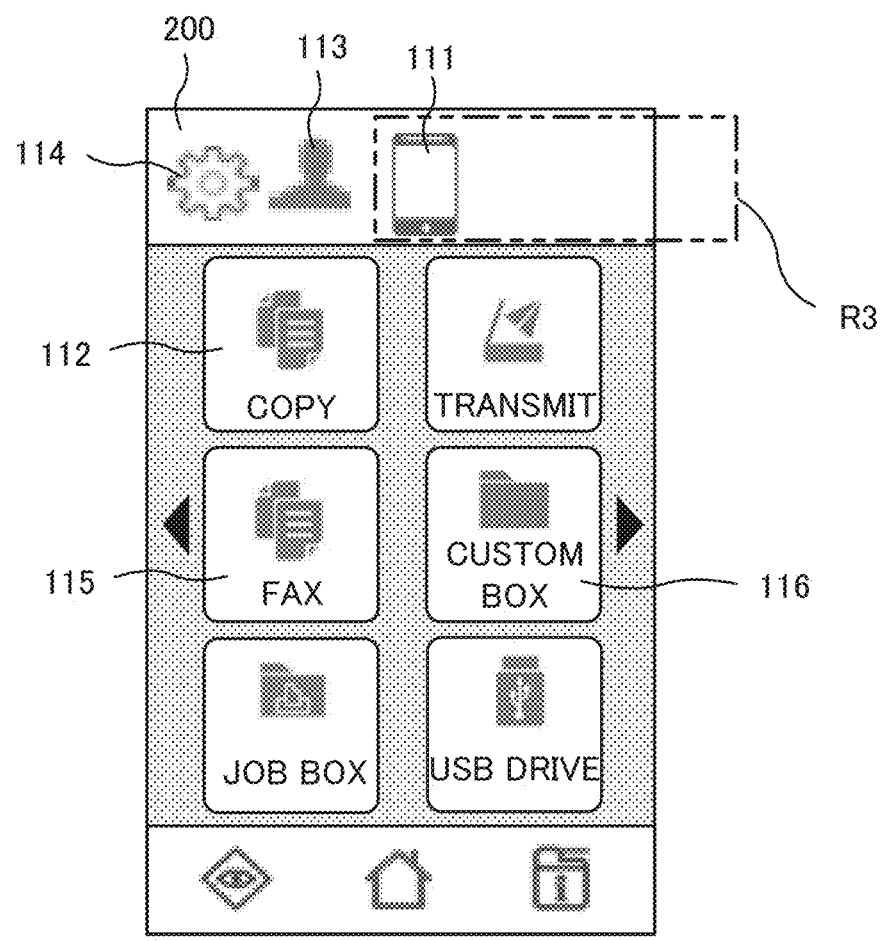
FIG. 20 is a schematic drawing showing an example of a second home screen, in which the display content has been partially changed.

According to the first variation, the controller 10 changes the position of only the region R2, upon deciding that the second home screen 110 being dragged moves beyond the borderline of the region R2. However, the disclosure is not limited to such an arrangement. FIG. 20 illustrates the second home screen, in which a part of the content has been modified.

For example, when the region R2 is located on the side of the one end portion in the longitudinal direction X, the controller 10 causes the display device 15 to display the second home screen 110 shown in FIG. 11, but causes the display device 15 to display a second home screen 200 shown in FIG. 20, when the region R2 is located on the side of the other end portion in the longitudinal direction X. The controller 10 locates only the second icon 111 and icons 113 and 114 displayed at the top of the second home screen 200, first home screen 110 at different positions from the second home screen 110.

According to the first variation, the controller 10 changes a part of the mobile screen to the design appropriate for the dominant hand of the user, along with the position change of the region R2. Therefore, the user-friendliness of the device can be further improved.

[Second Variation]

In the foregoing embodiment, the controller 10 causes the display device 15 to display the information about the predetermined plurality of items on the mobile screen. However, the disclosure is not limited to such an arrangement. In the second variation of the embodiment, the controller 10 changes the information to be displayed on the mobile screen, depending on the use history of each of the items.

Figure 21:
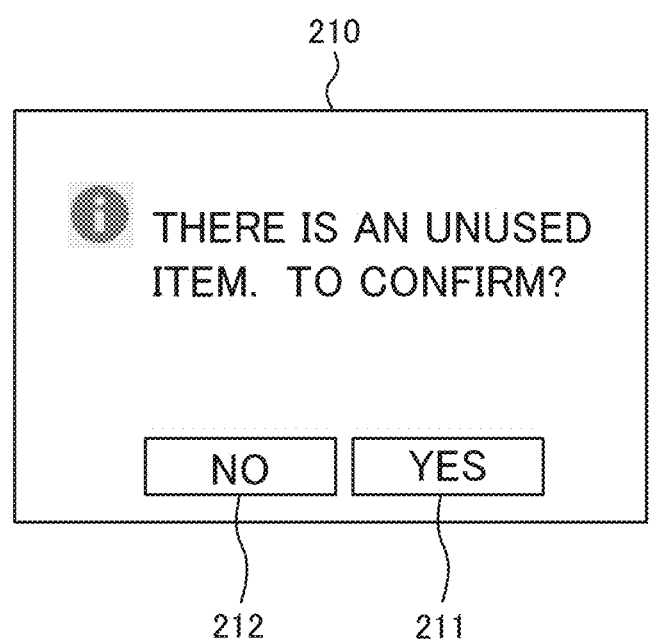
FIG. 21 is a schematic drawing showing an example of a fourth confirmation screen.
Figure 22:
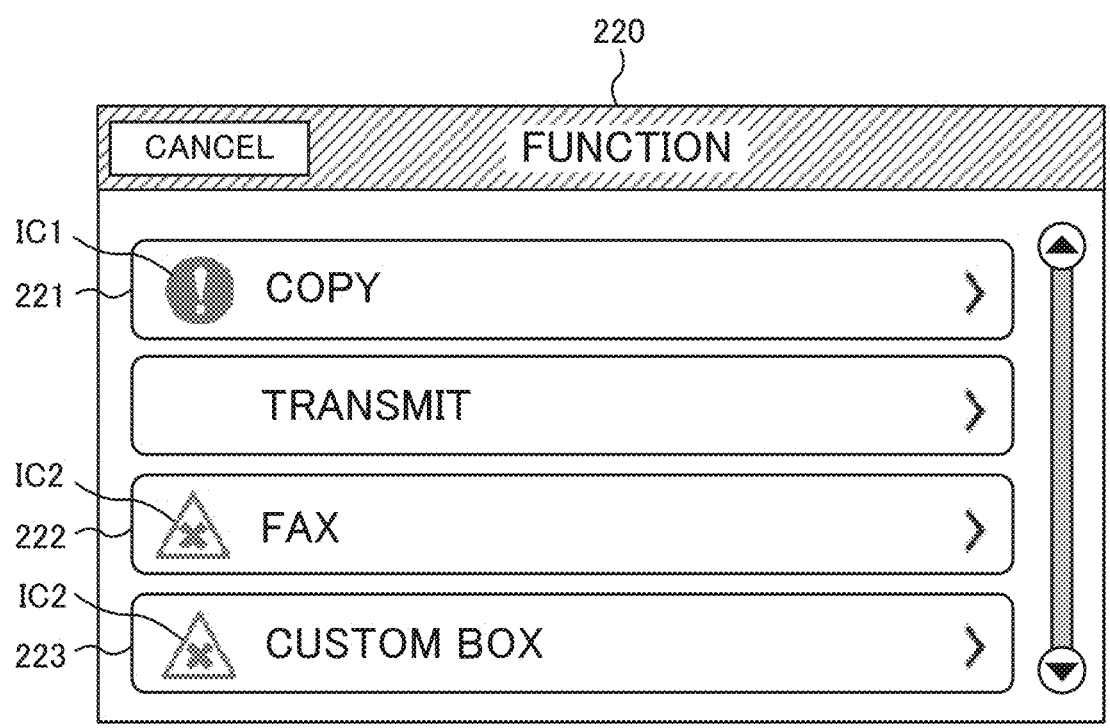
FIG. 22 is a schematic drawing showing an example of a first history screen.
Figure 23:
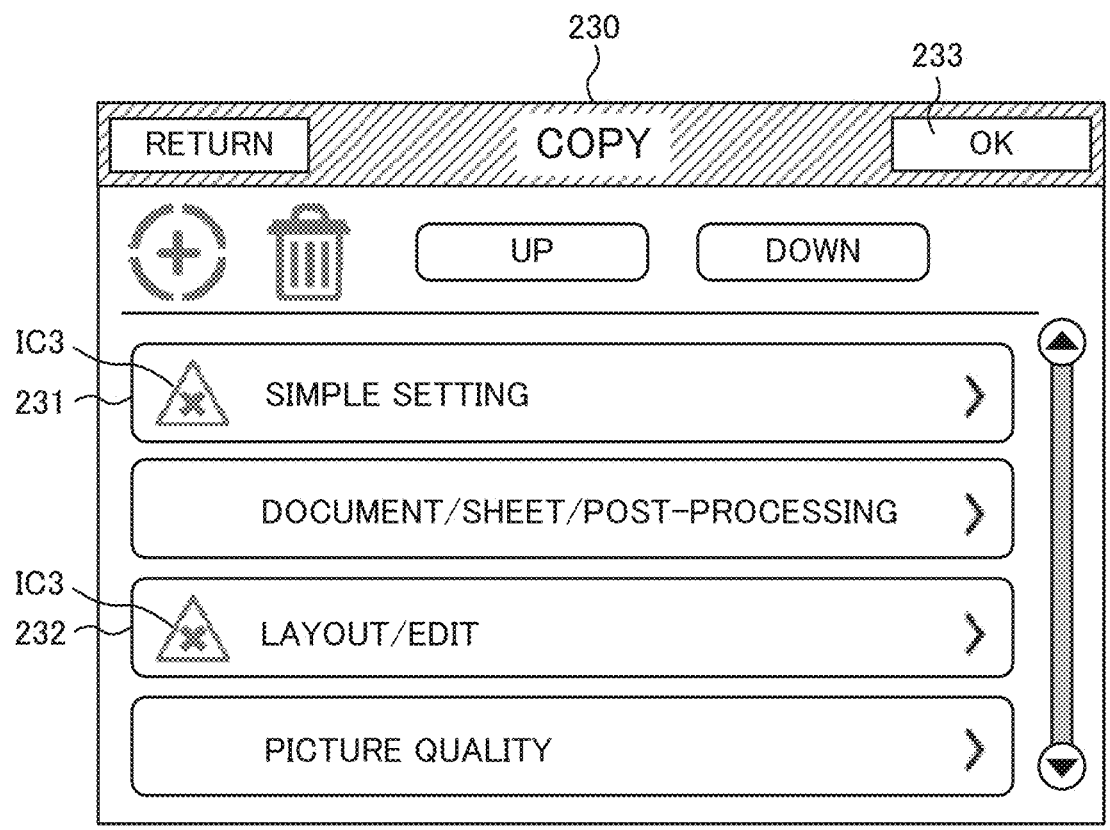
FIG. 23 is a schematic drawing showing an example of a second history screen.
Figure 24:
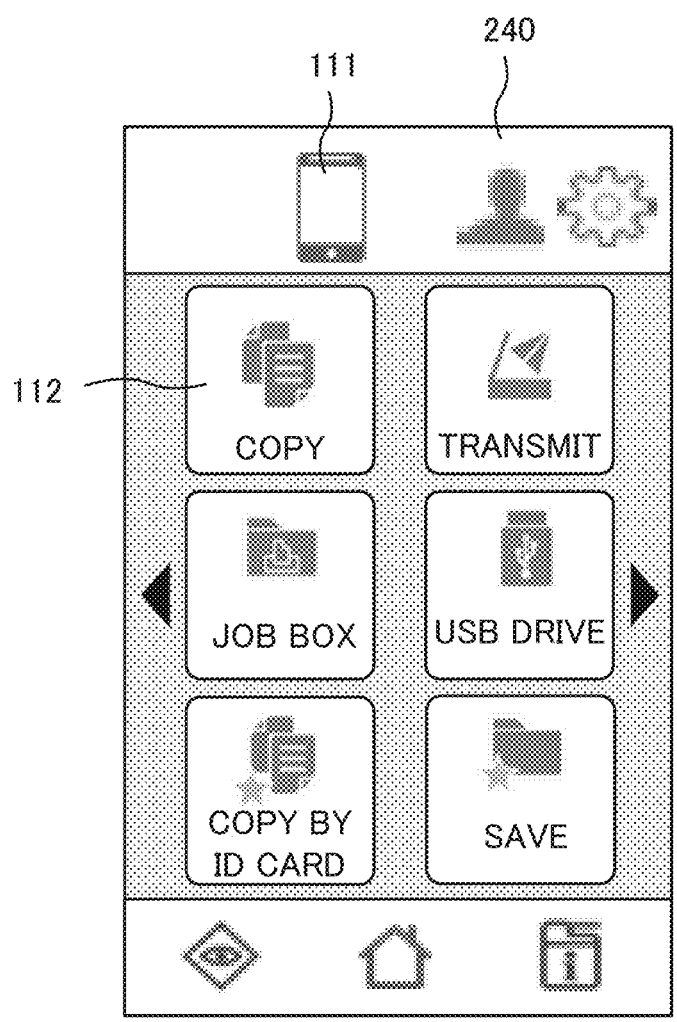
FIG. 24 is a schematic drawing showing an example of a mobile screen displaying information about items other than unused items.

FIG. 21 illustrates an example of a fourth confirmation screen. FIG. 22 illustrates an example of a first history screen. FIG. 23 illustrates an example of a second history screen. FIG. 24 illustrates an example of the mobile screen displaying information about items other than unused items. Referring to FIG. 21 to FIG. 24, an operation of the image forming apparatus 1 according to the second variation will be described hereunder.

In the second variation, the controller 10 stores the use history of each of a plurality of items to be used for the image forming apparatus 1 to execute the image forming operation, in the HDD 18. More specifically, the use history stored in the HDD 18 includes a first use history of each of the plurality of functions that the image forming apparatus 1 is configured to perform, and a second use history of each of the plurality of items to be set.

In the second variation, when the use history indicates an unused item, the controller 10 causes the display device 15 to display a fourth confirmation screen 210, including a key 211 for displaying a history screen indicating the unused item, and a key 212 for restricting the history screen from being displayed, as shown in FIG. 21. Here, the term "unused item" refers to an item that has never been used, since a predetermined time point.

It is assumed here that, as an example, the first history indicates the facsimile function and a custom box function as unused functions, and the second history indicates the items "Simple Setting" and "Layout/Edit" for the copying function, as unused items to be set.

Under the mentioned situation, the user touches the key 211, in view of the fourth confirmation screen 210. When the touch panel 16B detects the touch operation on the key 211, the controller 10 causes the display device 15 to display a first history screen 220 showing the unused functions, as shown in FIG. 22.

In this case, the controller 10 causes the display device 15 to display, inside a key 221 representing the copying function, a first icon IC1 indicating that the copying function includes the unused items to be set. The controller 10 also causes the display device 15 to display, inside a key 222 representing the facsimile function and a key 223 representing the custom box function, a second icon IC2 indicating that the corresponding function has not been used.

In view of the first history screen 220, the user touches the key 221. When the touch panel 16B detects the touch operation on the key 221, the controller 10 causes the display device 15 to display a second history screen 230, indicating the unused items to be set for the copying function, as shown in FIG. 23.

In this case, the controller 10 causes the display device 15 to display a third icon IC3 indicating that the corresponding item has not been used, inside a key 231 representing the item "Simple Setting", and a key 232 representing the item "Layout/Edit".

In view of the second history screen 230, the user touches a key 233 for displaying information about items other than the unused items (hereinafter, "used item"), on the mobile screen. When the touch panel 16B detects the touch operation on the key 233, the controller 10 generates the mobile screen displaying the information about the used item.

For example, as shown in FIG. 24, the controller 10 generates, as the mobile screen indicating the information about the unused item, a third home screen 240 displaying the plurality of function keys in the second home screen 110 shown in FIG. 11, except the key 115 representing the facsimile function and the key 116 representing the custom box function. Upon generating the third home screen 240, the controller 10 causes the display device 15 to display the third home screen 240, instead of the second home screen 110.

According to the second variation, the information of the unused item, assumed to be less important to the user, is not displayed on the mobile screen, and therefore the user can confirm only the information about the necessary items. As result, the user-friendliness of the device can be further improved.

Although the unused item is defined as the item that has never been used since a predetermined time point, in the second variation, the disclosure is not limited to such a setting. For example, the unused item may be an item that has been used equal to or less than a predetermined number of times, since a predetermined time point.

In addition, although the controller 10 causes the display device 15 to display on the information about the used items on the mobile screen, in the second variation, the disclosure is not limited to such an arrangement. The controller 10 may display only the information about the used items not only on the mobile screen, but also on the basic screen.

[Third Variation]

Although the controller 10 causes the display device 15 to display the information about the predetermined plurality of items on the mobile screen, in the foregoing embodiment, the disclosure is not limited to such an arrangement. In a third variation of the embodiment, the controller 10 changes the information to be displayed on the mobile screen, depending on the properties of the user.

In the third variation, when the user is a log-in user, permitted to use the image forming apparatus 1 upon undergoing log-in authentication using the user name and a password, the controller 10 causes the display device 15 to display only the information about the items designated in advance in association with the name of the log-in user, on the mobile screen. Alternatively, the controller 10 may store the use history of each of the plurality of items in the HDD 18 in advance, with respect to each of the user names, and cause the display device 15, when the use history corresponding to the name of the log-in user indicates an unused item, to display only the information about the items other than the unused item, on the mobile screen.

When the user is a guest user not authorized to undergo the log-in authentication, the controller 10 causes the display device 15 to display only the information about the items that the guest user is permitted to use, on the mobile screen. Further, the controller 10 may cause the display device 15, when an instruction to validate an accessibility function is received from the log-in user or the guest user, through the touch panel 16B, to display the information about all the items related to the image forming apparatus 1, on the mobile screen.

[Other Variations]

The disclosure may be modified in various manners, without limitation to the foregoing embodiment and variations. For example, although the image forming apparatus 1, constituted as a color MFP, is taken up in the foregoing embodiment as an example of the display apparatus, the disclosure is also applicable to various other image forming apparatuses, such as a monochrome MFP, a copier, and a facsimile machine, or other devices such as a tablet terminal or a smartphone.

Although the image forming device 12 is configured to form an image on the recording sheet P in the foregoing embodiment, the disclosure is not limited to such embodiment. The image forming device 12 may form an image on a different recording medium, other than the recording sheet. For example, an overhead projector (OHP) sheet may be employed, to form an image.

Further, the configurations and processings described in the foregoing embodiment and variations with reference to FIG. 1 to FIG. 24 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A display apparatus comprising:
   a display device that displays a screen in a display region;
   a touch panel overlaid on the display device; and
   a control device including a processor, and configured to act, when the processor executes a control program, as
      a controller that causes the display device to:
      display a first screen of a size that covers an entirety of the display region, with a predetermined first icon added to the first screen; and
      display, instead of the first screen, a second screen smaller in size than the first screen in a predetermined region, when the touch panel detects a predetermined operation performed on the first icon,
   wherein, when the touch panel detects a touch operation on the first icon, the controller causes the display device to display a position image indicating a display position of the second screen, in the predetermined region,
   when the touch panel detects a drag operation performed on the first icon in a predetermined first direction, the controller causes the display device to move the first icon in the first direction and to move the position image in the first direction in the predetermined region, in accordance with a moving direction and a travel distance of the drag operation, and
   when the touch panel stops detecting the touch operation on the first icon, the controller causes the display device to display the second screen instead of the first screen, at a position indicated by the position image, wherein the controller causes the display device to display a predetermined second icon together with the second screen, in the display region, and when the touch panel detects a drag operation performed on the second icon in the first direction, the controller causes the display device to move the second icon in the first direction and to move the second screen in the first direction in the predetermined region, in accordance with a moving direction and a travel distance of the drag operation, wherein the display region is formed in a horizontally long shape, the controller locates the predetermined region on a side of one end portion of the display region in a longitudinal direction, and when the controller decides that the position image or the second screen moves beyond a borderline of the predetermined region on a side of the other end portion in the longitudinal direction, because of being moved in accordance with a moving direction and a travel distance of the drag operation, the controller causes the display device to display a confirmation screen to confirm whether or not to change the position of the predetermined region, locates, when receiving an instruction for changing the position of the predetermined region, the predetermined region on the side of the other end portion of the display region, in the longitudinal direction and maintains, when receiving an instruction for not changing the position of the predetermined region, the predetermined region on the side of one end portion of the display region.

2. The display apparatus according to claim 1, wherein, when the touch panel detects a predetermined operation on the second icon, the controller causes the display device to display the first screen with the first icon added thereto in the display region, instead of the second screen.

3. The display apparatus according to claim 1, wherein the controller locates a part of a plurality of icons included in the second screen at different positions, between when the predetermined region is located on the side of the one end portion of the display region in the longitudinal direction, and when the predetermined region is located on the side of the other end portion of the display region in the longitudinal direction.

4. The display apparatus according to claim 1, wherein the second screen is formed in a vertically long shape, and in a predetermined size based on a size of a user's hand.

5. The display apparatus according to claim 1, wherein the controller causes the display device to display the second screen in the predetermined region, and also a third screen displaying information about at least a part of a content of the second screen, in a region other than the predetermined region, and the controller further causes the display device to display a line image connecting the at least a part and the third screen.

6. An image forming apparatus comprising:

the display apparatus according to claim 1;

an image forming device that forms an image on a recording sheet; and a hard disk drive for storing a use history of each of a plurality of items for executing an image forming operation, wherein, when the user history indicates an unused item, the controller causes the display device to display information about an item other than the unused item, on the second screen.

\* \* \* \* \*